US010671273B2

(12) United States Patent
Jung et al.

(10) Patent No.: US 10,671,273 B2
(45) Date of Patent: Jun. 2, 2020

(54) METHOD FOR CONTROLLING USER INTERFACE ACCORDING TO HANDWRITING INPUT AND ELECTRONIC DEVICE FOR IMPLEMENTING THE SAME

(71) Applicant: Samsung Electronics Co., Ltd., Gyeonggi-do (KR)

(72) Inventors: In-Hyung Jung, Gyeongsangbuk-do (KR); Sangheon Kim, Gyeongsangbuk-do (KR); Jong-Wu Baek, Gyeongsangbuk-do (KR); Geon-Soo Kim, Gyeonggi-do (KR); Yohan Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 448 days.

(21) Appl. No.: 15/374,383

(22) Filed: Dec. 9, 2016

(65) Prior Publication Data
US 2018/0004406 A1    Jan. 4, 2018

(30) Foreign Application Priority Data

Jul. 4, 2016    (KR) .......................... 10-2016-0084261

(51) Int. Cl.
*G06F 3/0484*    (2013.01)
*G06F 3/0488*    (2013.01)
(Continued)

(52) U.S. Cl.
CPC ...... *G06F 3/04883* (2013.01); *G06F 3/03545* (2013.01); *G06F 3/0416* (2013.01);
(Continued)

(58) Field of Classification Search
CPC .... G06F 3/04883; G06F 17/24; G06F 3/0488; G06K 9/00429
See application file for complete search history.

(56) References Cited

U.S. PATENT DOCUMENTS 5,778,404 A * 7/1998 Capps .................... G06F 17/24
345/179
5,867,150 A * 2/1999 Bricklin .............. G06F 16/5854
345/173
(Continued)

FOREIGN PATENT DOCUMENTS

KR    1020130135425    12/2013
KR    1020150102359    9/2015

OTHER PUBLICATIONS

Displaying Text Content in iOS, Copyright 2014 Apple Inc., Mar. 10, 2014, pp. 3 . . . https://developer.apple.com/library/ios/documentation/StringsTextFonts/Conceptual/TextAndWebiPhoneOS/UsingTextClasses/UsingTextClasses.html.
(Continued)

*Primary Examiner* — Jordany Nunez
(74) *Attorney, Agent, or Firm* — The Farrell Law Firm, P.C.

(57) ABSTRACT

An electronic device and a method of the electronic device is provided. The electronic device includes a touch screen display that displays a user interface, a force sensor that detects a pressure with which an external object touches the touch screen display, a wireless communication circuit, and a processor that controls the touch screen display to display the user interface, receives, from at least one of the force sensor and the wireless communication circuit, data representing that the external object is pressing a portion of the user interface with a pressure greater than or equal to a selected pressure, receives a handwriting input through the touch screen display, and displays the handwriting input on the user interface on the touch screen display.

13 Claims, 28 Drawing Sheets

(51) Int. Cl.
*G06F 3/0481* (2013.01)
*G06K 9/00* (2006.01)
*G06K 9/20* (2006.01)
*G06K 9/22* (2006.01)
*G06F 3/0354* (2013.01)
*G06F 3/041* (2006.01)

(52) U.S. Cl.
CPC ....... *G06F 3/0484* (2013.01); *G06K 9/00402* (2013.01); *G06K 9/00416* (2013.01); *G06K 9/2081* (2013.01); *G06K 9/222* (2013.01); *G06F 2203/04105* (2013.01)

(56) References Cited

U.S. PATENT DOCUMENTS

| | | | | |
|---|---|---|---|---|
| 5,898,434 A * | 4/1999 | Small | ................ | G06F 3/0481 715/810 |
| 6,340,967 B1 * | 1/2002 | Maxted | ............ | G06F 3/04883 345/156 |
| 10,346,510 B2 * | 7/2019 | Thimbleby | ........... | G06F 40/171 |
| 2004/0150631 A1 * | 8/2004 | Fleck | ................ | G06F 3/03545 345/179 |
| 2009/0159342 A1 * | 6/2009 | Markiewicz | ............ | G06F 3/038 178/18.01 |
| 2010/0306698 A1 * | 12/2010 | Sellers | ................ | G06F 17/241 715/805 |
| 2013/0321314 A1 | 12/2013 | Oh et al. | | |
| 2014/0078070 A1 | 3/2014 | Armstrong-Muntner | | |
| 2014/0325402 A1 | 10/2014 | Jung et al. | | |
| 2015/0212721 A1 * | 7/2015 | Hayasaka | ........... | G06F 3/04847 715/833 |
| 2015/0277596 A1 | 10/2015 | Hoffman et al. | | |
| 2016/0070399 A1 | 3/2016 | Hotelling | | |
| 2016/0070401 A1 | 3/2016 | Kim et al. | | |
| 2016/0070402 A1 | 3/2016 | Kim et al. | | |
| 2016/0085424 A1 * | 3/2016 | Kim | .................... | G06F 3/0481 345/661 |

OTHER PUBLICATIONS

Messenger Overview, https://developers.facebook.com/docs/messenger/overview, pp. 4.
Tryit Editor v3, http://www.w3schools.com/svg/tryit.asp?filename=trysvg_path, pp. 1.

* cited by examiner

FIG.18

METHOD FOR CONTROLLING USER INTERFACE ACCORDING TO HANDWRITING INPUT AND ELECTRONIC DEVICE FOR IMPLEMENTING THE SAME

PRIORITY

This application claims priority under 35 U.S.C. § 119(a) to Korean Patent Application Serial No. 10-2016-0084261, which was filed in the Korean Intellectual Property Office on Jul. 4, 2016, the entire content of which is incorporated herein by reference.

BACKGROUND

1. Field of the Disclosure

The present disclosure relates generally to a method and device for controlling a user interface according to a handwriting input.

2. Description of the Related Art

With the development of digital technology, various types of electronic devices, such as a mobile communication terminal, a personal digital assistant (PDA), an electronic scheduler, a smart phone, a tablet personal computer (PC), a wearable device, or the like have been widely used. The electronic devices, as described above, are continuously improved in hardware parts and/or software parts in order to support and increase functions of the electronic devices. For example, the electronic device includes a display area (for example, LCD, touch screen) provided on a front surface, and recently, also on one or more side surfaces of the electronic device.

Further, the electronic device receives a touch input by using a touch screen provided on the display area and provides a user interface that responds to the touch input. The electronic device may also detect a pressure input by using a force sensor equipped therein and provide a user interface that responds to the pressure input.

In order for a user to insert notes into an image while viewing the image, the user may return to a home screen application page, execute a notes application, and create notes through the notes application. That is, the electronic device must switch from an image application screen to the home screen and then switch from the home screen to the notes application screen, and then provide a keypad screen (or keyboard) for inputting notes on the notes application screen. Therefore, there is an inconvenience in that multi-screen switching is needed for creating notes while viewing an image.

In addition, in order to input data into the notes application, the electronic device may provide a keypad or a handwriting input widow for the handwriting input (e.g., a note-taking window for inputting notes). However, when a user inputs data using both the keypad and the handwriting input window, there is an inconvenience in that switching should be performed between an input window through the keypad and the note-taking window.

SUMMARY

The present disclosure has been made to address at least the above-mentioned problems and/or disadvantages and to provide at least the advantages described below.

Accordingly, an aspect of the present disclosure is to provide a method and device for providing various user interfaces utilizing handwriting input on the basis of the user's intention, by controlling an electronic device using a pressure input.

Accordingly, another aspect of the present disclosure is to control an electronic device using a pressure input so that various user interfaces utilizing the handwriting input can be provided.

Accordingly, another aspect of the present disclosure is to allow for maintaining an input to be continuous, based on handwriting input, without unnecessary screen transitions or depth movement for the screen transitions, for user convenience.

Accordingly, another aspect of the present disclosure is to allow input data to be converted and processed based on information on a position where a touch is detected, pressure information, or attribute information of an application.

In accordance with an aspect of the present disclosure, an electronic device is provided. The electronic device includes a touch screen display that displays a user interface, a force sensor that detects a pressure with which an external object touches the touch screen display, a wireless communication circuit, and a processor that controls the touch screen display to display the user interface, receives, from at least one of the force sensor and the wireless communication circuit, data representing that the external object is pressing a portion of the user interface with a pressure greater than or equal to a selected pressure, receives a handwriting input through the touch screen display, and displays the handwriting input on the user interface on the touch screen display.

In accordance with another aspect of the present disclosure, an electronic device is provided. The electronic device includes a touch screen display that displays a user interface, a wireless communication circuit, and a processor that controls the touch screen display to display the user interface, receives, from an external object, data representing that the external object is pressing a portion of the user interface with a pressure greater than or equal to a selected pressure, through the wireless communication circuit, receives a handwriting input through the touch screen display; and displays the handwriting input on the user interface on the touch screen display.

In accordance with another aspect of the present disclosure, a method of an electronic device is provided. The method includes detecting a touch input in a user interface, determining whether the detected touch input corresponds to a pressure input, when the detected touch input corresponds to the pressure input, receiving a handwriting input, and processing the user interface to correspond to the handwriting input.

In accordance with another aspect of the present disclosure, a computer-readable storage medium having stored thereon instructions, which when executed perform the steps of displaying a user interface on a touch screen display, receiving, from at least one of a force sensor and a wireless communication circuit, data representing that an external object is pressing a portion of the user interface with a pressure greater than or equal to a selected pressure, receiving a handwriting input through the touch screen display, and displaying the handwriting input on the user interface on the touch screen display.

BRIEF DESCRIPTION OF THE DRAWINGS

The above and other aspects, features, and advantages of the present disclosure will be more apparent from the following detailed description taken in conjunction with the accompanying drawings, in which:

FIGS. 13 to 18 illustrate user interfaces for processing a handwriting input in an electronic device, according to an embodiment of the present disclosure;

DETAILED DESCRIPTION OF EMBODIMENTS OF THE PRESENT DISCLOSURE

Figure 1:
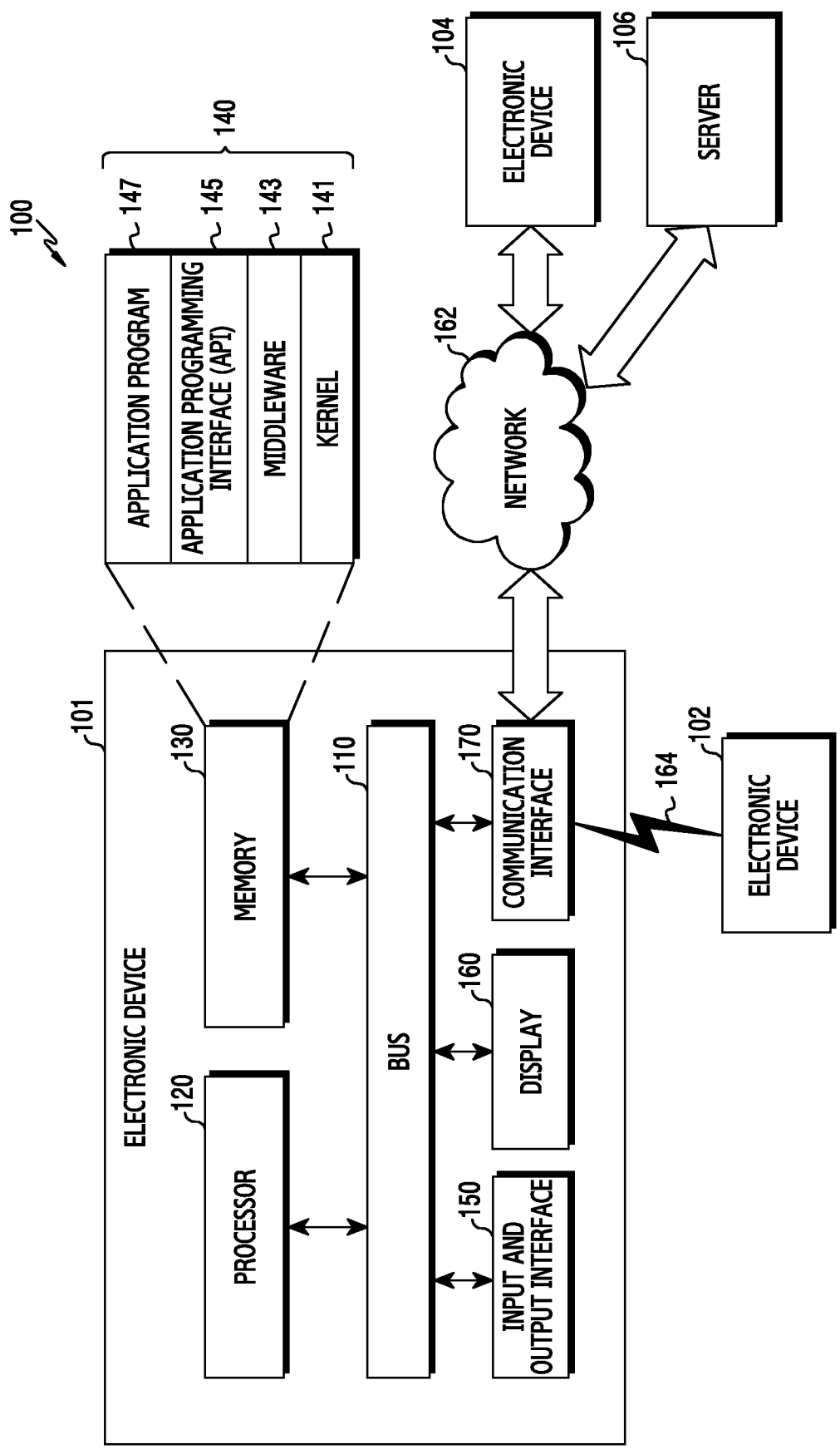
FIG. 1 is a diagram of an electronic device in a network environment, according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including A, (2) including B, or (3) including A and B.

In the present disclosure, the expressions "a first", "a second", "the first", "the second", etc. may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., a first element) is referred to as being "connected," or "coupled," to another element (e.g., a second element), the first element may be directly connected or coupled directly to the other element or any other element (e.g., a third element) may be interposed between them. In contrast, when an element (e.g., a first element) is referred to as being "directly connected," or "directly coupled" to another element (e.g., a second element), there are no element (e.g., a third element) interposed between them.

The expression "configured to", used in the present disclosure, may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

The terms used in the present disclosure are only used to describe specific embodiments of the present disclosure, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have meanings equivalent to the contextual meanings in the relevant field of art, and are not to be interpreted to have ideal or excessively formal meanings unless clearly so defined in the present disclosure. In some cases, even a term defined in the present disclosure should not be interpreted to exclude embodiments of the present disclosure.

An electronic device according to various embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of a television, a digital versatile disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device, and a gyro-compass), an avionics device, a security device, an automotive head unit, a robot for home or industry, an automatic teller machine (ATM), a point of sales (POS) machine, or Internet of Things (IoT) device (e.g., a light bulb, various sensors, an electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. The electronic device may be a flexible device.

Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an electronic device in a network environment, according to an embodiment of the present disclosure.

Referring to FIG. 1, an electronic device 101 within a network environment 100 is provided. The electronic device 101 may include a bus 110, a processor 120, a memory 130, an input/output interface 150, a display 160, and a communication interface 170. The electronic device 101 may omit at least one of the above components or may further include other components.

The bus 110 is a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out calculation or data processing relating to control and/or communication of at least one other component of the electronic device 101.

The memory 130 may include a volatile memory and/or a non-volatile memory. The memory 130 may store commands or data relevant to at least one other component of the electronic device 101. The memory 130 may store software and/or a program 140. The program 140 may include a kernel 141, middleware 143, an Application Programming Interface (API) 145, and/or an application program 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the application program 147). Furthermore, the kernel 141 may provide an interface through which the middleware 143, the API 145, or the application program 147 may access the individual components of the electronic device 101 to control or manage the system resources.

The middleware 143 may serve as an intermediary for allowing the API 145 or the application program 147 to communicate with the kernel 141 to exchange data.

Also, the middleware 143 may process one or more task requests received from the application program 147 according to priorities thereof. For example, the middleware 143 may assign priorities for using the system resources (e.g., the bus 110, the processor 120, the memory 130, or the like) of the electronic device 101, to at least one of the application program 147. For example, the middleware 143 may perform scheduling or load balancing on the one or more task requests by processing the one or more task requests according to the priorities assigned thereto.

The API 145 is an interface through which the application program 147 controls functions provided from the kernel 141 or the middleware 143, and may include at least one interface or function (e.g., instruction) for file control, window control, image processing, character control, and the like.

The input/output interface 150 may function as an interface that may transfer commands or data input from a user or another external device to the other elements of the electronic device 101. Furthermore, the input/output interface 150 may output the commands or data received from the other elements of the electronic device 101 to the user or another external device.

Examples of the display 160 may include a liquid crystal display (LCD), a light-emitting diode (LED) display, an organic light-emitting diode (OLED) display, a microelectromechanical system (MEMS) display, and an electronic paper display. The display 160 may display various types of contents (e.g., text, images, videos, icons, or symbols) to users. The display 160 may include a touch screen, and may receive a touch, gesture, proximity, or hovering input using an electronic pen or a user's body part.

The communication interface 170 may establish communication between the electronic device 101 and a first external electronic device 102, a second external electronic device 104, or a server 106. For example, the communication interface 170 may be connected to a network 162 through wireless or wired communication, and may communicate with the second external electronic device 104 or the server 106.

The wireless communication may use at least one of long term evolution (LTE), LTE-advance (LTE-A), code Division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include short range communication 164. The short-range communication 164 may include at least one of Wi-Fi, Bluetooth, near field communication (NFC), and global navigation satellite system (GNSS). GNSS may include at least one of global positioning system (GPS), global navigation satellite system (Glonass), Beidou Navigation satellite system (Beidou), Galileo, the European global satellite-based navigation system, based on a location, a bandwidth, or the like. Hereinafter, in the present disclosure, "GPS" may be interchangeably used with "GNSS".

The wired communication may include at least one of a universal serial bus (USB), a high definition multimedia interface (HDMI), recommended standard 232 (RS-232), and a plain old telephone service (POTS).

The network 162 may include at least one of a telecommunication network, such as a computer network (e.g., a LAN or a WAN), the Internet, and a telephone network.

Each of the first and second external electronic devices 102 and 104 may be of a type identical to or different from that of the electronic device 101. The server 106 may include a group of one or more servers.

According to various embodiments of the present disclosure, all or some of the operations performed in the electronic device 101 may be executed in another electronic device or a plurality of electronic devices (e.g., the electronic devices 102 and 104 or the server 106). When the electronic device 101 has to perform some functions or services automatically or in response to a request, the electronic device 101 may request another device (e.g., the external electronic devices 102 or 104 or the server 106) to execute at least some functions relating thereto instead of or in addition to autonomously performing the functions or services. In this case, the other electronic device (e.g., the external electronic device 102 or 104, or the server 106) may execute the requested functions or the additional functions, and may deliver a result of the execution to the electronic device 101. The electronic device 101 may process the received result as it is or additionally, and may provide the requested functions or services. To this end cloud computing, distributed computing, or client-server computing technologies may be used.

Figure 2:
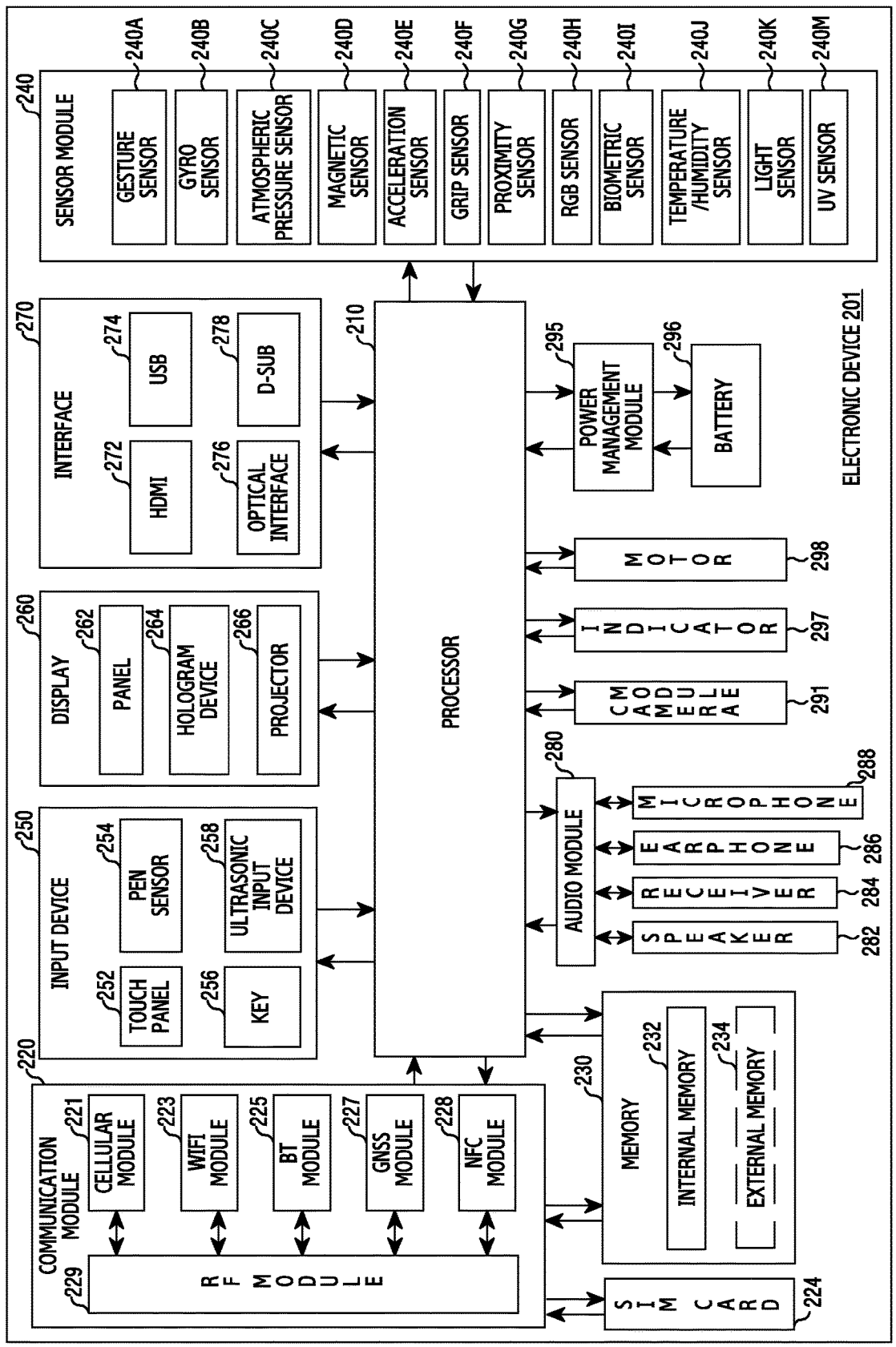
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 may include all or a part of the electronic device 101 shown in FIG. 1. The electronic device 201 may include one or more processors 210 (e.g., application processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as a system on chip (SoC). The processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221 may provide a voice call, a video call, a text message service, or an Internet service through a communication network. The cellular module 221 may distinguish and authenticate the electronic device 201 in a communication network using a SIM card 224. The cellular module 221 may perform at least some of the functions that the AP 210 may provide. The cellular module 221 may include a communication processor (CP).

For example, each of the Wi-Fi module 223, the BT module 225, the GNSS module 227, and the NFC module 228 may include a processor for processing data transmitted/received through a corresponding module.

According to an embodiment of the present disclosure, at least some of the cellular module 221, the Wi-Fi module 223, the BT module 225, the GNSS module 227, and the NFC module 228 may be included in one integrated chip (IC) or IC package.

The RF module 229 may transmit/receive a communication signal (e.g., an RF signal). The RF module 229 may include a transceiver, a power amplifier module (PAM), a frequency filter, a low noise amplifier (LNA), and an antenna.

According to another embodiment of the present disclosure, at least one of the cellular module 221, the WIFI module 223, the BT module 225, the GNSS module 227, and the NFC module 228 may transmit/receive an RF signal through a separate RF module.

The SIM card 224 may include a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include an embedded memory 232 or an external memory 234.

The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may include a flash drive a compact flash (CF), a secure digital (SD), a micro secure digital (Micro-SD), a mini secure digital (Mini-SD), an extreme digital (xD), a multi-media card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include at least one of a gesture sensor 240A, a gyro sensor 240B, an atmospheric pressure sensor (i.e., barometer) 240C, a magnetic sensor 240D, an acceleration sensor 240E, a grip sensor 240F, a proximity sensor 240G, a red, green, and blue (RGB) sensor 240H, a biometric sensor (i.e., medical sensor) 240I, a temperature/humidity sensor 240J, an light sensor 240K, and a Ultra Violet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258.

The touch panel 252 may use at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include a recognition sheet which is a part of the touch panel 252 or is separated from the touch panel 252.

The key 256 may include a physical button, an optical key or a keypad.

The ultrasonic input device 258 may detect, through a microphone 288, ultrasonic waves generated by an input tool, and identify data corresponding to the detected ultrasonic waves.

The display 260 (e.g., the display 160) may include a panel 262, a hologram device 264, or a projector 266.

The panel 262 may include a configuration identical or similar to the display 160 illustrated in FIG. 1. The panel 262 may be implemented to be flexible, transparent, or wearable. The panel 262 may be embodied as a single module with the touch panel 252. The hologram device 264 may show a three dimensional (3D) image in the air by using an interference of light.

The projector 266 may project light onto a screen to display an image. The screen may be located in the interior of or on the exterior of the electronic device 201.

The display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, a secure digital (SD) card/multimedia card (MMC) interface, or an infrared data association (IrDA) standard interface.

The audio module 280 may bilaterally convert a sound and an electrical signal.

At least some components of the audio module 280 may be included in the input/output interface 150 illustrated in FIG. 1. The audio module 280 may process voice information input or output through a speaker 282, a receiver 284, earphones 286, or the microphone 288.

The camera module 291 is a device which may photograph a still image and a video. The camera module 291 may include one or more image sensors (e.g., a front sensor or a back sensor), a lens, an image signal processor (ISP) or a flash (e.g., LED or xenon lamp).

The power management module 295 may manage power of the electronic device 201. The power management module 295 may include a power management integrated circuit (PMIC), a charger integrated circuit (IC), or a battery gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, etc.) for wireless charging may be further included. The battery gauge may measure a residual quantity, and a voltage, a current, or a temperature while charging of the battery 296. The battery 296 may include a rechargeable battery and/or a solar battery.

The indicator 297 may display a particular state (e.g., a booting state, a message state, a charging state, or the like) of the electronic device 201 or a part (e.g., the processor 210) of the electronic device 201.

The motor 298 may convert an electrical signal into a mechanical vibration, and may generate a vibration, a haptic effect, or the like. The electronic device 201 may include a processing device (e.g., a GPU) for supporting a mobile TV. The processing device for supporting a mobile TV may process media data according to a certain standard such as digital multimedia broadcasting (DMB), digital video broadcasting (DVB), or mediaFLO™.

Each of the above-described elements of hardware according to the present disclosure may be configured with one or more components, and the names of the corresponding elements may vary based on the type of electronic device. In various embodiments, the electronic device may include at least one of the above-described elements, some of the above-described elements may be omitted from the electronic device, or the electronic device may further include additional elements. Also, some of the hardware components according to various embodiments may be combined into one entity, which may perform functions identical to those of the relevant components before the combination.

Figure 3:
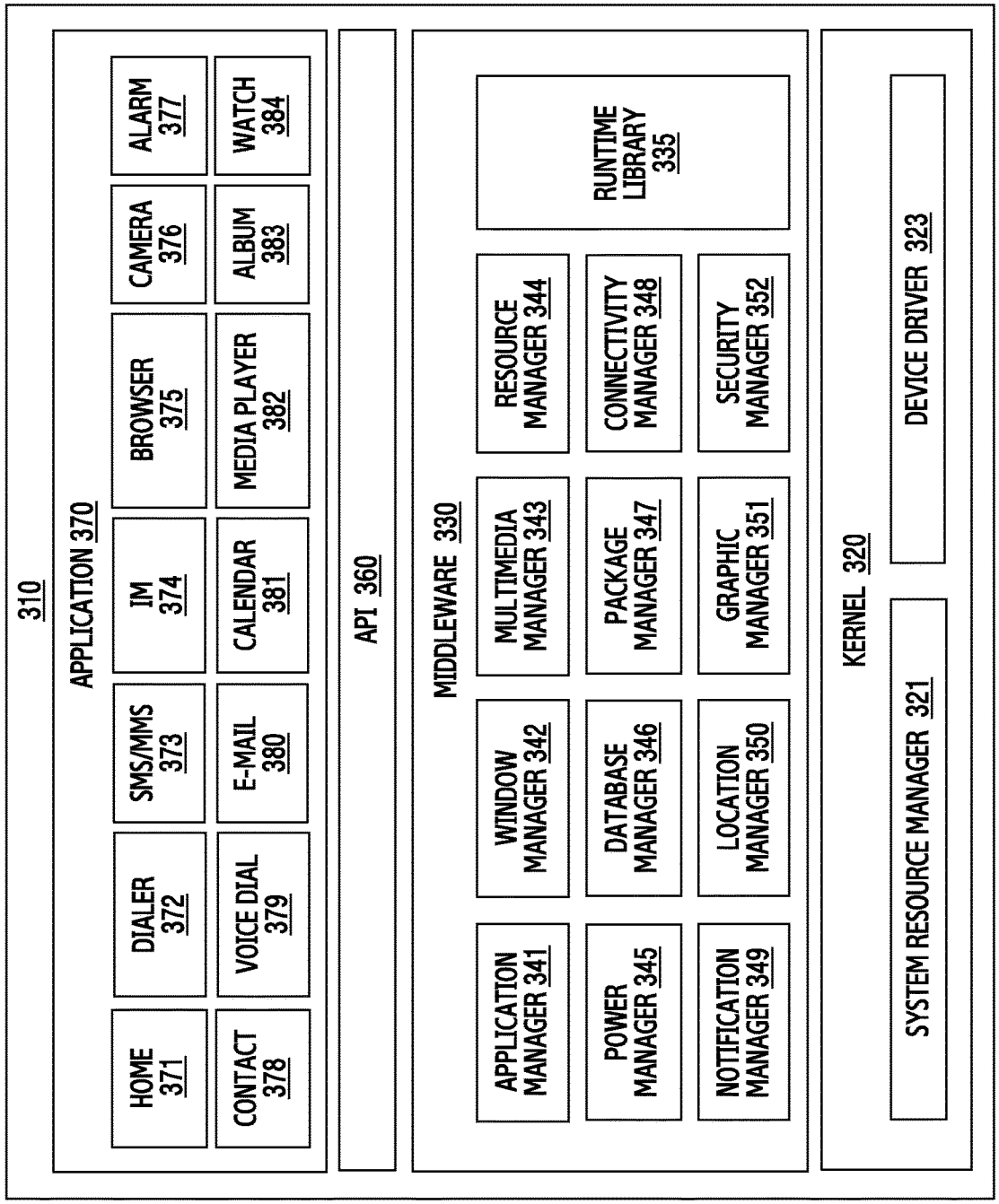
FIG. 3 is a block diagram of a program module, according to an embodiment of the present disclosure.

FIG. 3 is a block diagram of a program module, according to an embodiment of the present disclosure.

Referring to FIG. 3, a program module 310 is provided. The program module 310 (e.g., the program 140) may include an operating system (OS) for controlling resources related to the electronic device 101 and/or the application program 147 executed in the OS. The operating system may be, for example, Android™, iOS™, Windows™, Symbian™, Tizen™, Bada™, or the like.

The program module 310 may include a kernel 320, middleware 330, an API 360, and/or an application 370. At least some of the program module 310 may be preloaded on an electronic device 101, or may be downloaded from an external electronic device (e.g., the external electronic devices 102 or 104, or the server 106).

The kernel 320 (e.g., the kernel 141) may include a system resource manager 321 and/or a device driver 323.

The system resource manager 321 may control, allocate, or collect system resources. The system resource manager 321 may include a process management unit, a memory management unit, a file system management unit, and the like.

The device driver 323 may include a display driver, a camera driver, a Bluetooth driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so as to enable the application 370 to efficiently use the limited system resources in the electronic device 101. The middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage a life cycle of at least one application 370.

The window manager 342 may manage graphical user interface (GUI) resources used by a screen.

The multimedia manager 343 may recognize a format required for reproduction of various media files, and may perform encoding or decoding of a media file by using a codec suitable for the corresponding format.

The resource manager 344 may manage resources of a source code, a memory, and a storage space of at least one of the application 370.

The power manager 345 may operate together with a basic input/output system (BIOS) or the like to manage a battery or power source and may provide power information or the like required for the operations of the electronic device 101.

The database manager 346 may generate, search for, and/or change a database to be used by at least one of the applications 370.

The package manager 347 may manage installation or an update of an application 370 distributed in a form of a package file.

The connectivity manager 348 may manage wireless connectivity such as Wi-Fi or Bluetooth.

The notification manager 349 may display or notify of an event such as an arrival message, promise, proximity notification, and the like in such a way that does not disturb a user.

The location manager 350 may manage location information of the electronic device 101.

The graphic manager 351 may manage a graphic effect which will be provided to a user, or a user interface related to the graphic effect.

The security manager 352 may provide all security functions required for system security, user authentication, or the like.

According to an embodiment of the present disclosure, when the electronic device 101 has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is a set of API programming functions, and may be provided with a different configuration according to an OS. For example, in the case of Android™ or iOS™, one API set may be provided for each platform. In the case of Tizen™, two or more API sets may be provided for each platform.

The application 370 (e.g., the application program 147) may include one or more applications which may provide functions such as a home 371, a dialer 372, an SMS/MMS 373, an instant message (IM) 374, a browser 375, a camera 376, an alarm 377, contacts 378, a voice dial 379, an email 380, a calendar 381, a media player 382, an album 383, a watch 384. The application 370 may additionally or alternatively include an application which provides health care information (e.g., measuring exercise quantity or blood sugar), or environment information (e.g., providing atmospheric pressure, humidity, or temperature information).

The applications 370 may include an "information exchange application" that supports exchanging information between the electronic device 101 and an external electronic device (e.g., the external electronic devices 102 or 104). The information exchange application may include a notification relay application for transferring specific information to an external electronic device or a device management application for managing an external electronic device.

The notification relay application may include a function of transferring, to the external electronic device (e.g., the external electronic device 102 or 104), notification information generated from other applications of the electronic device 101 (e.g., an SMS/MMS application, an e-mail application, a health management application, or an environmental information application). Further, the notification relay application may receive notification information from an external electronic device and provide the received notification information to a user.

The device management application may manage (e.g., install, delete, or update) at least one function of an external electronic device (e.g., the external electronic device 102 or 104) communicating with the electronic device 101 (e.g., a function of turning on/off the external electronic device itself (or some components) or a function of adjusting the brightness (or a resolution) of the display), applications operating in the external electronic device, and services provided by the external electronic device (e.g., a call service or a message service).

The application 370 may include applications (e.g., a health care application of a mobile medical appliance or the like) designated according to attributes of an external electronic device (e.g., attributes of the external electronic device 102 or 104). The application 370 may include an application received from an external electronic device (e.g., the server 106, or the external electronic device 102 or 104). The application 370 may include a preloaded application or a third party application that may be downloaded from the server 106. The names of the components of the program module 310 may change according to the type of OS.

According to various embodiments, at least a part of the program module 310 may be implemented in software, firmware, hardware, or a combination of two or more thereof. At least some of the program module 310 may be implemented (e.g., executed) by the processor 210. At least some of the program module 310 may include a module, a program, a routine, a set of instructions, and/or a process for performing one or more functions.

The term "module" as used herein may refer to a unit including one of hardware, software, and firmware or a combination of two or more of them. The term "module" may be interchangeably used with the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which are now known or are to be developed in the future.

According to various embodiments, at least some of the devices (for example, modules or functions thereof) or the method (for example, operations) according to the present disclosure may be implemented by a program instruction stored in a computer-readable storage medium in the form of a program module. The program instruction, when executed by the processor 120, may cause the processor 120 to execute the function corresponding to the instruction. The computer-readable recoding media may be the memory 130.

The computer readable storage medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory), and the like. In addition, the program instruction may include high class language codes, which can be executed in a computer by using an interpreter, as well as machine codes made by a compiler. The aforementioned hardware device may be configured to operate as one or more software modules in order to perform the operation of the present disclosure, and vice versa. Hereinafter, an electronic device may be the electronic device 101, illustrated in FIG. 1, or the electronic device 201, illustrated in FIG. 2. For the convenience of explanation, the electronic device 101 of FIG. 1 will be described as an example. However, the electronic device is not necessarily limited to the electronic device 101 of FIG. 1.

Figure 4A:
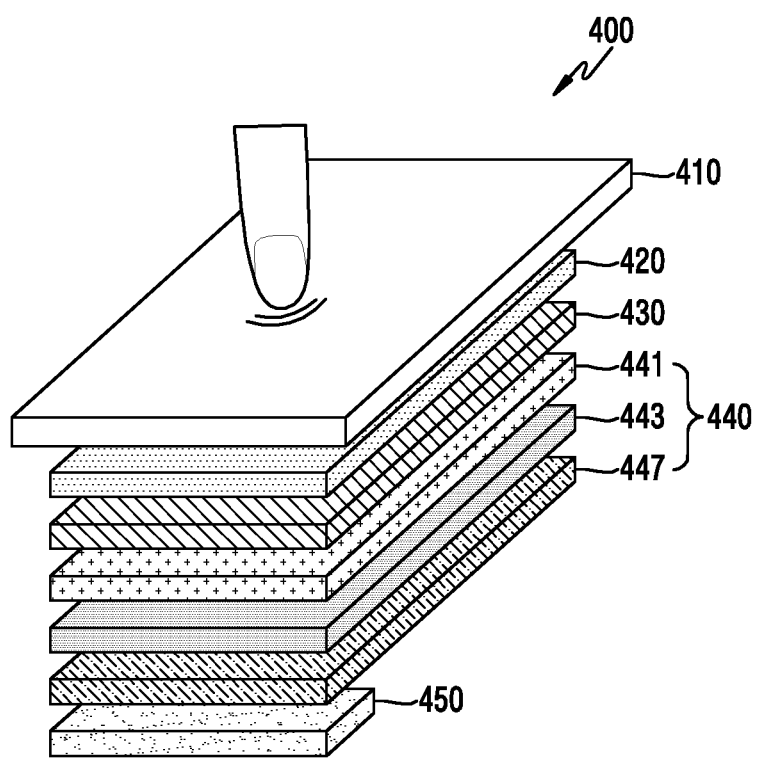
FIGS. 4A and 4B are diagrams of an electronic device, according to an embodiment of the present disclosure.
Figure 4B:
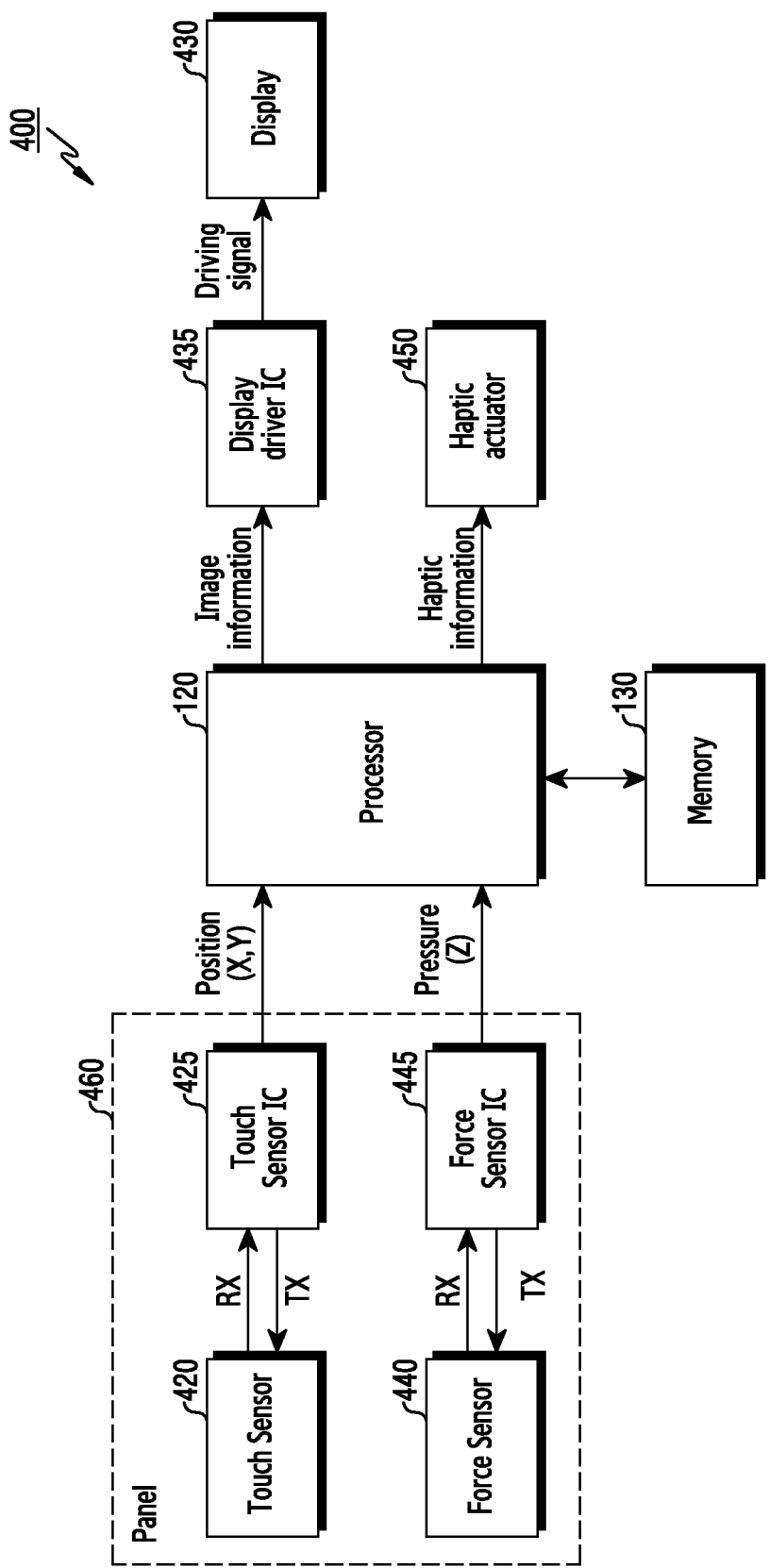

FIGS. 4A and 4B are diagrams of an electronic device, according to an embodiment of the present disclosure.

Referring to FIG. 4A, an electronic device 400 is provided. The electronic device 400 may include a cover window 410, a touch sensor 420, a display 430, a force sensor 440, and a haptic actuator 450, inside a housing (or body).

The housing may include a first surface facing in a first direction and a second surface facing in a second direction opposite to the first direction. Here, the first surface may correspond to a front surface of the electronic device 400, and for example, may be a surface that displays a user interface through the display 430. The cover window 410 may correspond to the first surface of the housing. The second surface may correspond to a back surface (or a rear surface) of the electronic device 400.

The touch sensor 420 may be disposed between the first surface and the second surface of the housing, and may detect at least one touch point, on the display 430, by an external object. For example, the touch sensor 420 may be disposed between the cover window 410 and the display 430. According to various embodiments, the touch sensor 420 may be embedded in the display 430 (e.g., a touch screen).

The display 430 may be disposed between the first surface and second surface of the housing and exposed through the first surface. The display 430 may correspond to the display 160 of FIG. 1 and the display 260 of FIG. 2. The display 430 may be disposed in the lower end of the touch sensor 420.

The force sensor 440 may be disposed between the first surface and the second surface of the housing, and may be disposed in the lower end of the display 430. The force sensor 440 may include a first electrode 441, a dielectric layer 443, and a second electrode 447. The first electrode 441 or the second electrode 447 may be formed of a transparent material or non-transparent material. The transparent material is a transparent electrically conductive material, and may be formed of at least one of indium tin oxide (ITO), indium zinc oxide (IZO), ag nanowire, metal mesh, transparent polymer conductor, and graphene, or a combination of two or more thereof. The non-transparent material may be formed of at least one of copper (Cu), silver (Ag), magnesium (Mg), titanium (Ti), and graphene, or a combination of two or more thereof. The dielectric layer 443 may include at least one of silicon, air, foam, membrane, optical clear adhesive (OCA) film, sponge, rubber, inks, polymers (for example, polycarbonate (PC)), polyethylene terephthalate (PET), etc.

One of the first electrode 441 and the second electrode 447 may be a ground substrate, and the other may be formed of a repeated polygonal pattern. In this case, the force sensor 440 may detect a pressure in a self-capacitance method.

One of the first electrode 441 and the second electrode 447 may be a first direction pattern (TX), and the other one may be a second direction pattern (RX) perpendicular to the first direction. In this case, the force sensor 440 may detect a pressure in a mutual capacitance method.

The first electrode 441 of the force sensor 440 may be formed on a flexible printed circuit boards (FPCB) and attached to the display 430 or directly formed on one surface of the display 430.

The haptic actuator 450 may provide a haptic effect to a user, and may provide, to the user, a haptic effect when the user presses the electronic device 400.

Referring to FIG. 4B, a hardware configuration of the electronic device 400 is illustrated. The electronic device 400 may include the processor 120, the memory 130, a panel 460, a display 430, a display driver IC 435, and a haptic actuator 450.

The panel 460 may include a touch sensor 420, a touch sensor integrated circuit (IC) 425, a force sensor 440, or a force sensor IC 445.

The processor 120 may receive a position signal (for example, coordinates (X, Y)) or a pressure signal (for example, force coordinates (X, Y, Z) or force intensity (Z)) from the panel 460. For example, the processor 120 may receive, from the touch sensor IC 425, a position signal (for example, coordinates (X, Y)) that is detected by the touch sensor 420 in the panel 460. The processor 120 may receive, from the force sensor IC 445, the pressure signal (for example, pressure coordinates (X, Y, Z) or pressure intensity (Z)) detected by the force sensor 440 in the panel 460. The processor 120 may synchronize the position signal of the touch sensor 420 and the pressure signal of the force sensor 440. Since the touch sensor 420 and the force sensor 440 may individually detect whether signals are generated, the processor 120 may synchronize two signals rather than simultaneously processing the pressure signal with the touch signal. For example, the touch signal may be detected when the user touches the display 430 and may be generated without the pressure signal. However, the pressure signal may be detected when the display 430 is touched and deeply pressed in a direction thereof, and may not be generated without the touch signal. When the input signal is generated, the processor 120 may synchronize the touch signal and the pressure signal and process the same as one input.

In addition, the processor 120 may receive, from the panel 460, a position signal and pressure signal by a pen. For example, the processor 120 may receive, from the touch sensor IC 425, the position signal of the pen (for example, coordinates (X, Y)) that is detected by the touch sensor 420 in the panel 460. The processor 120 may receive, from the force sensor IC 445, the pressure signal of the pen (for example, a pressure coordinate (Z) or a pressure intensity (Z)) detected by the force sensor 440 in the panel 460. The processor 120 may synchronize the pen position signal and the pen pressure signal. In addition, the processor 120 may receive a detection signal for the pen from the communication interface 170.

The processor 120 may transmit image information to the display driving IC 435, and the display driving IC 435 may transmit, to the display 430, a driving signal for driving the display 430 according to the image information. The processor 120 may transmit haptic information to the haptic actuator 450.

Figure 5A:
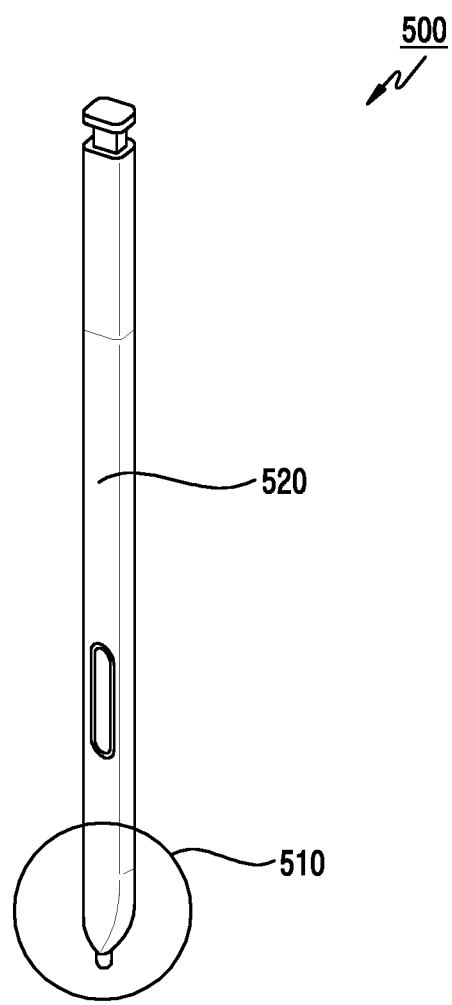
FIGS. 5A and 5B are diagrams of a pen, according to an embodiment of the present disclosure.
Figure 5B:
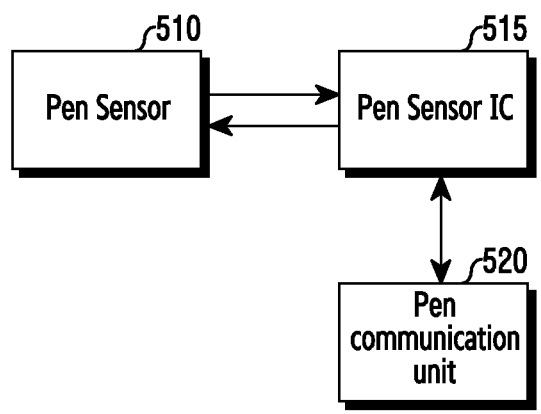

FIGS. 5A and 5B are diagrams of a pen, according to an embodiment of the present disclosure.

Referring to FIG. 5A, an exterior view of a pen 500 is illustrated. The pen 500 may include a pen sensor 510 and a pen communication unit 520. The pen sensor 510 may be embedded in a pen tip section that contacts or proximately approaches to the electronic device 101. For example, the pen sensor 510 may be a touch sensor or a force sensor. The pen communication unit 520 may be embedded in a connection section in an area in which the user holds the pen 500. Alternatively, the pen communication unit 520 may be mounted together with the pen sensor 510.

Referring to FIG. 5B, a hardware configuration of the pen 500 is illustrated. The pen 500 may include a pen sensor 510, a pen sensor IC 515, and a pen communication unit 520.

The pen sensor 510 may generate a signal by contacting or proximately approaching to the electronic device 101.

The pen sensor IC 515 may allow the generated signal to be detected by the touch sensor 420 of the electronic device 101 or the force sensor 440 of the electronic device 101.

The pen communication unit 520 may transmit a signal output from the pen sensor IC 515 to the electronic device 101. The signal output by the pen sensor IC 515 may be a position signal or pressure signal.

Figure 6A:
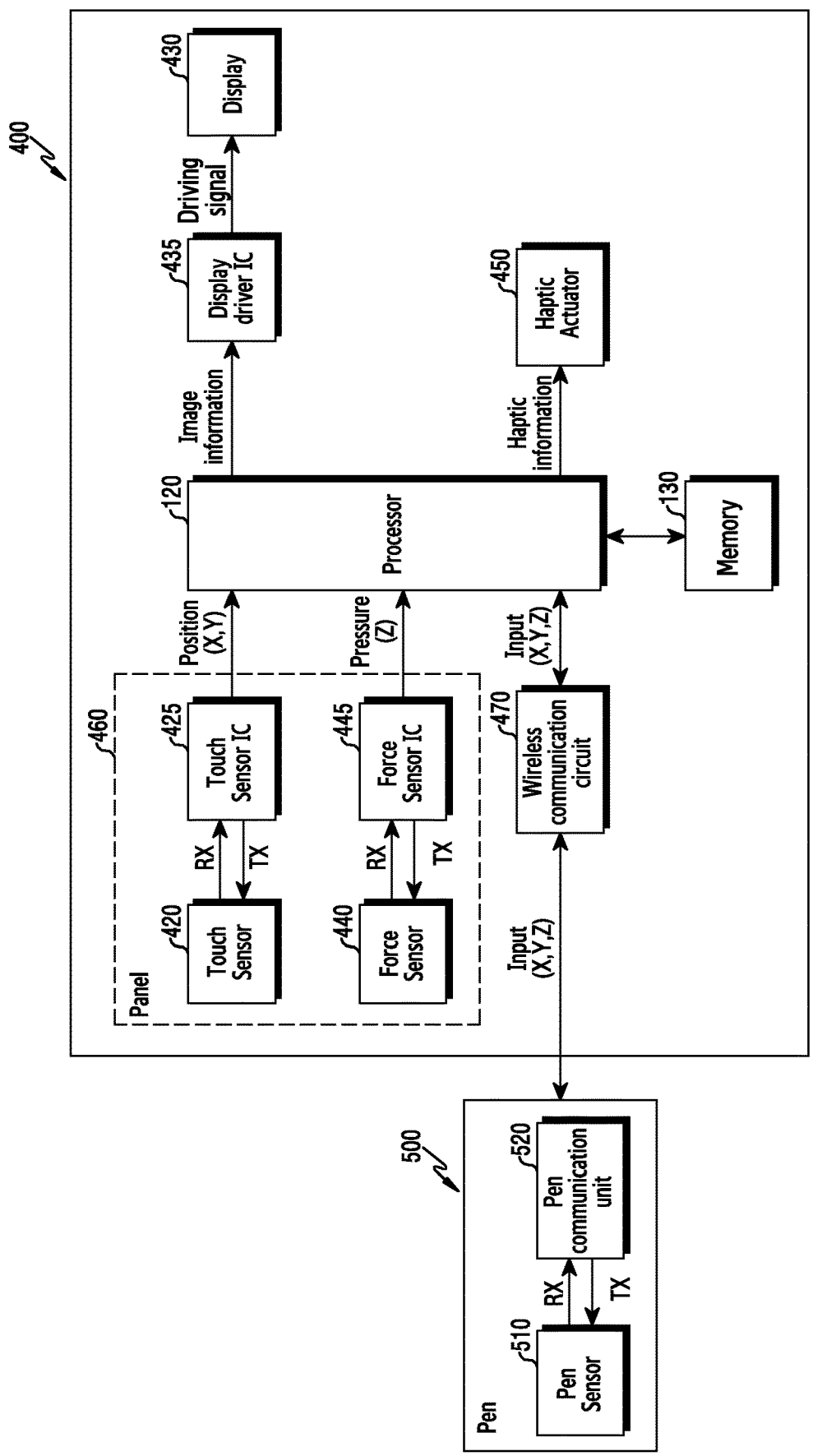
FIGS. 6A and 6B are block diagrams of configurations of an electronic device and a pen, according to an embodiment of the present disclosure.
Figure 6B:
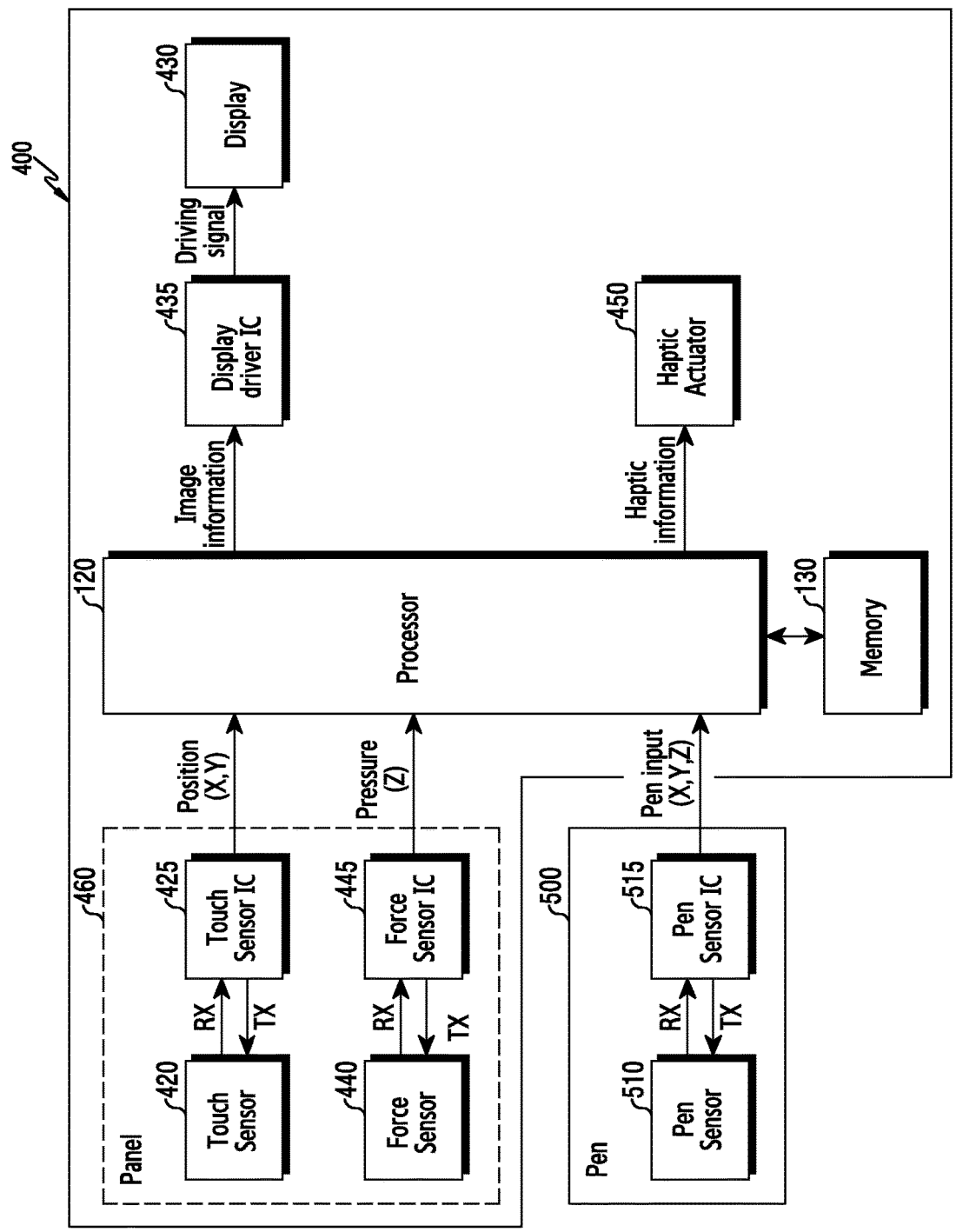

FIGS. 6A and 6B are block diagrams of configurations of an electronic device and a pen, according to an embodiment of the present disclosure.

Referring to FIG. 6A, the electronic device 400 and the pen 500 are provided. The electronic device 400 may include the processor 120, the memory 130, the display 430, the display driving IC 435, the haptic actuator 450, the panel 460, and the wireless communication circuit 470. The pen 500 may include the pen sensor 510 and the pen communication unit 520. The electronic device 400 may receive a signal from the pen 500 through the wireless communication circuit 470. For example, the electronic device 400 may receive a position signal or a pressure signal from the pen 500 through the wireless communication circuit 470.

Referring to FIG. 6B, the electronic device 400 and the pen 500 are provided. The electronic device 400 may include the processor 120, the memory 130, the display 430, the display driving IC 435, the haptic actuator 450, and the panel 460. The pen 500 may include the pen sensor 510 and the pen sensor IC 515. The processor 120 may detect a touch signal or a pressure signal by the pen 500.

Figure 7A:
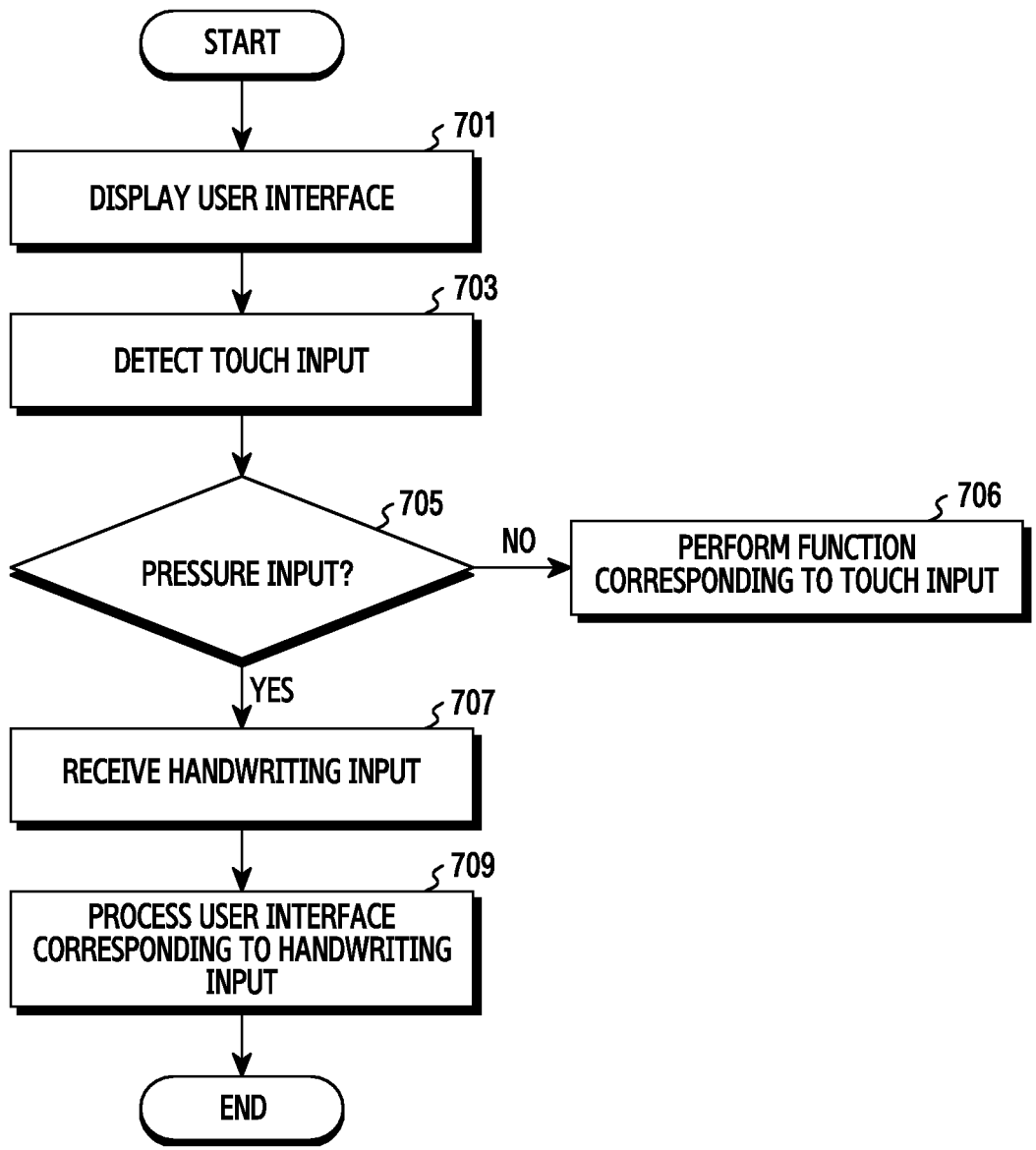
FIG. 7A is a flowchart of a method of an electronic device, according to an embodiment of the present disclosure.

FIG. 7A is a flowchart of a method of an electronic device, according to an embodiment of the present disclosure.

Referring to FIG. 7A, in step 701, the processor 120 of the electronic device 101 may display a user interface. The user interface may be one that includes at least one of text, an image (e.g., an icon of an application), a picture, and a video. The user interface may be displayed on the display 430 and the display 430 may refer to a touch screen display.

In step 703, the processor 120 of the electronic device 101 may detect the touch input. The processor 120 may receive, on the user interface, a touch input from an external object. The touch input may be generated when the external object contacts or proximately approaches to the display 430. When the external object contacts or proximately approaches to the display 430, the external object may be a medium through which a touch by the touch sensor 420 or pressure by the force sensor 440 can be detected, and may be at least one of the user's body and finger, and a touch pen. The processor 120 may detect the touch input by the touch sensor 420 or the force sensor 440. Alternatively, the processor 120 may receive a signal (e.g., the position signal or the pressure signal) corresponding to the touch input from the pen communication unit 520 of the external object through the wireless communication circuit 470.

The processor 120 may receive data associated with the touch input. The data may include position information, movement information, pressure information (e.g., a hover input or a pressure input), touch information, or palm touch information, which are associated with the touch input. The palm touch may mean that the touch is detected in a relatively large area such as by the user's palm. The palm touch may be detected when the touch input is detected at a portion of the display 430 in the electronic device 101 having a relatively big screen. For example, the touch input may be made by the user's finger, and the palm touch may be made by the user's hand.

In step 705, the processor 120 of the electronic device 101 may determine whether the touch input is the pressure input. For example, the pressure input refers to pressure detected by the force sensor 440 in a state where the touch input is maintained. Here, the pressure detected by the force sensor 440 may refer to a pressure input greater than or equal to a threshold value.

Referring to the hardware configurations described with respect to FIGS. 6A and 6B, when a touch is more deeply pressed on the display 430, the force sensor 440 may recognize whether the pressure is generated and transmit the occurrence of the pressure to the force sensor IC 445. The force sensor IC 445 may transmit the pressure signal (e.g., a pressure coordinate (Z) or a pressure intensity (Z)) in which the pressure has occurred. The processor 120 may receive the pressure signal from the force sensor IC 445 so as to detect the pressure input associated with the touch input.

The pressure input may be detected at a position where the touch input is generated or at a position proximate (or adjacent) to the position where the touch input is generated. In other words, when the user touches and deeply presses the display 430, the position of the pressure input may be different from the position where the display 430 is deeply pressed so as to generate the touch input. In addition, since the touch sensor 420 may determine whether the touch input is generated, and the force sensor 440 may determine whether the pressure input is generated, the positions where the respective inputs are generated may be different. To this end, when an additional pressure input is generated in a state where the touch input is maintained, the processor 120 may synchronize the touch input and the pressure input in order to process the same as one input.

When the detected touch input is the pressure input, the processor 120 may perform step 707, and when the detected touch input is not the pressure input, the processor 120 may perform step 706.

When the detected touch input is not the pressure input, the processor 120 of the electronic device 101 may perform a function corresponding to the touch input, in step 706. For example, when the touch input touching an icon associated with an application is released, the processor 120 may execute the application associated with the touched icon. Alternatively, when the user touches an input field (or an input area) in a message application and then releases the touch input, the processor 120 may display the keypad (or keyboard) on the display 430. That is, the processor 120 may perform a function on the basis of the position where the touch input is detected.

When the detected touch input is the pressure input, the processor 120 of the electronic device 101 may receive the handwriting input, in step 707. The handwriting input may be an input by which the display 430 is pressed and then moved in a state where the touch input detected in step 703 is maintained. According to various embodiments, in order to receive the handwriting input, the processor 120 may load a recognition engine that recognizes the handwriting input to the memory 130 and execute the same. The processor 120 may recognize the handwriting input for the movable touch input using the recognition engine.

For example, the processor 120 may perform character recognition, segmentation, and language modeling for the handwriting input through the recognition engine to convert stroke data corresponding to the handwriting input into characters. The processor 120 may acquire stroke data that is generated by a touch and generate index data corresponding to the stroke data. The index data may represent characters corresponding to the stroke data. One index data may correspond to a single character or multiple pieces of index data may be combined into a single character.

The segmentation may refer to dividing information on handwritten text into meaningful segments of different levels (for example, lines, words, letters). The segmentation method may vary according to the user's handwriting style input for the recognition thereof. For example, for "English Cursive Writing", the processor 120 may review all available segmentations, but not limited thereto, from the input strokes (for example, letters "b" and "y") and curves thereof. For example, the processor 120 may segment the input strokes and curves thereof into letters "l", "r", and "j".

The character recognition refers to extracting a feature that can distinguish different characters from a digital link. For example, the processor 120 may classify the features so as to match the feature to a character to be recognized. The processor 120 examines physical features of the received digital link a height-to-width ratio, the number of intersection points between strokes, a slope defined from a starting point to an ending point of one character, and a curve degree thereof. The processor 120 may classify characters based on the analysis of the extracted features. For the classification of the features, a pattern recognition technique based on artificial intelligence, which is referred to as a neural network, is used, and the neural network may determine the classification of characters using parameters required to analyze the handwriting input. Through the process described above, the character recognition enables a list of possible candidates of each character to be output along with score information related thereto.

The language modeling may refer to checking that the handwriting input is meaningful by using available linguistic resources among the list of candidates that are proposed by the segmentation and character recognition and to generating new candidates. For example, the linguistic resources may be divided into a natural language and a simple language (specific language) according to a resource. The natural language may be a language that people usually understand as a language and refer to a set of available languages commonly used in conversations, such as French, English, Spanish, Korean, etc. The specific language may refer a set of formats having a special form while being used in general conversation, such as numbers, dates, phone number formats, and the like.

The processor 120 may separate a layer (e.g., a first layer) that receives a handwriting input and a layer (e.g., a second layer) that displays the handwriting input. The first layer and the second layer may each correspond to the display 430, and may correspond to each other. For example, the first layer may be disposed on the second layer, and may receive the handwriting input. In addition, the second layer may be a layer on which the user interface is displayed. Therefore, the processor 120 may separate a handwriting recognition layer (e.g., the first layer) and a handwriting display layer (e.g., the second layer) so that the user interface can be less influenced by the handwriting input. For example, even when the handwriting input is detected from a particular button included in the user interface, the processor 120 may receive the handwriting input without performing a function corresponding to the particular button.

In step 709, the processor 120 of the electronic device 101 may process the user interface corresponding to the handwriting input. The processor 120 may determine a data type of the handwriting input based on the object in which the touch input is detected or attribute information of the object, and convert data corresponding to the handwriting input depending on the data type, and process the converted data in conjunction with the object. The object may correspond to a position where the touch input is detected in the user interface. For example, the object may be at least one of text, images, pictures, video, and buttons.

When the object is an image, the processor 120 may determine the data type as an image, convert data corresponding to the handwriting input into the image, and process the converted image. For example, according to the image processing, the processor 120 may merge the handwriting input into the image of the object and convert the same into bitmap data, and process the converted bitmap image. The processor 120 may merge the bitmap image into the image of the object. Alternatively, when the object is an input field, the processor 120 may determine the data type as text, convert data corresponding to the handwriting input to text, and process the converted text. According to the text processing, the processor 120 may input text corresponding to the handwriting input to the input field corresponding to the object. For example, when the object is a text box, the processor 120 may convert the stroke data into Unicode text, and input the converted text to the text box. Alternatively, when the object is a button, the processor 120 may determine the data type as text, on the basis of the attributes of the button, convert data corresponding to the handwriting input to text, and process the converted text. For example, according to the text processing, the processor 120 may transmit text corresponding to the handwriting input in conjunction with a button corresponding to the object. For example, when the object is a button that performs a particular function and a function mapped to the button indicates "perform text input", the processor 120 may determine the data type as text and convert the same. When a function mapped to the button indicates "Transmit a message to a particular target", the processor 120 may transmit the converted text using a parameter to the particular target.

Figure 7B:
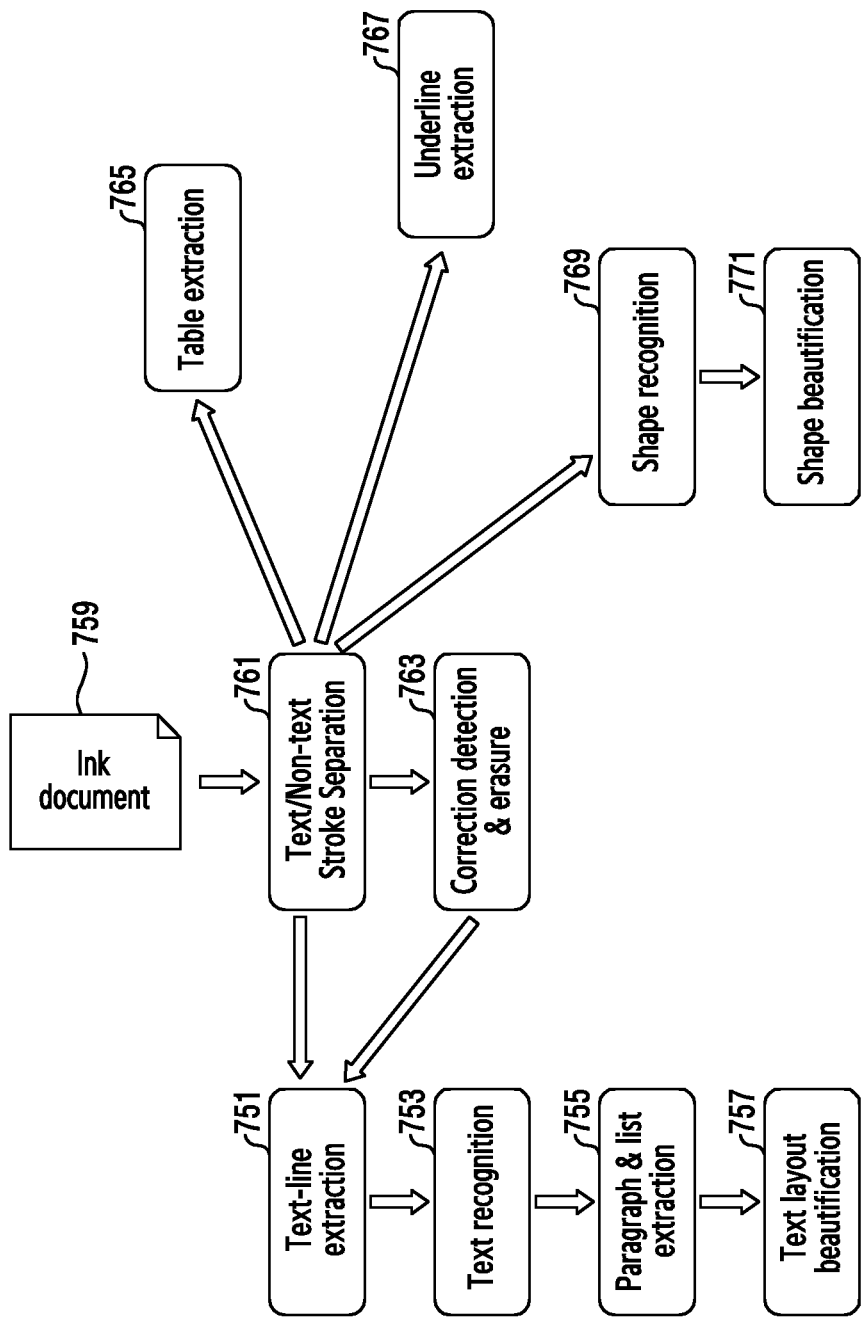
FIG. 7B is a diagram illustrating a method for recognizing and converting stroke data in an electronic device, according to an embodiment of the present disclosure.

FIG. 7B is a diagram illustrating a method for recognizing and converting stroke data in an electronic device, according to an embodiment of the present disclosure.

Referring to FIG. 7B, when the writing input such as, an ink document 759, is received, the processor 120 of the electronic device 101 may separate the handwriting input into text or non-text. Text/non-text stroke separation 761 may separate the handwriting input 759 into text or non-text. For example, when the handwriting input 759 corresponds to the natural language, the text/non-text stroke separation 760 may perform text recognition operations 751 to 757, and when the handwriting input 759 corresponds to the specific language (e.g., number, symbol, etc.), the text/non-text stroke separation 761 may control the processes for recognizing the handwriting input to perform non-text recognition operations 765 to 771.

The text recognition operation may include operations of performing text-line extraction 751, text recognition 753, paragraph and list extraction 755, and text layout beautification 757 in the handwriting input 759. When the text-line extraction 751 is performed, the processor 120 may perform an operation of correction detection and erasure 763. The non-text recognition operation may include operations of performing table extraction 765, underlining extraction 767, shape recognition 769, and shape beautification 771 from the handwriting input 759.

Figure 8A:
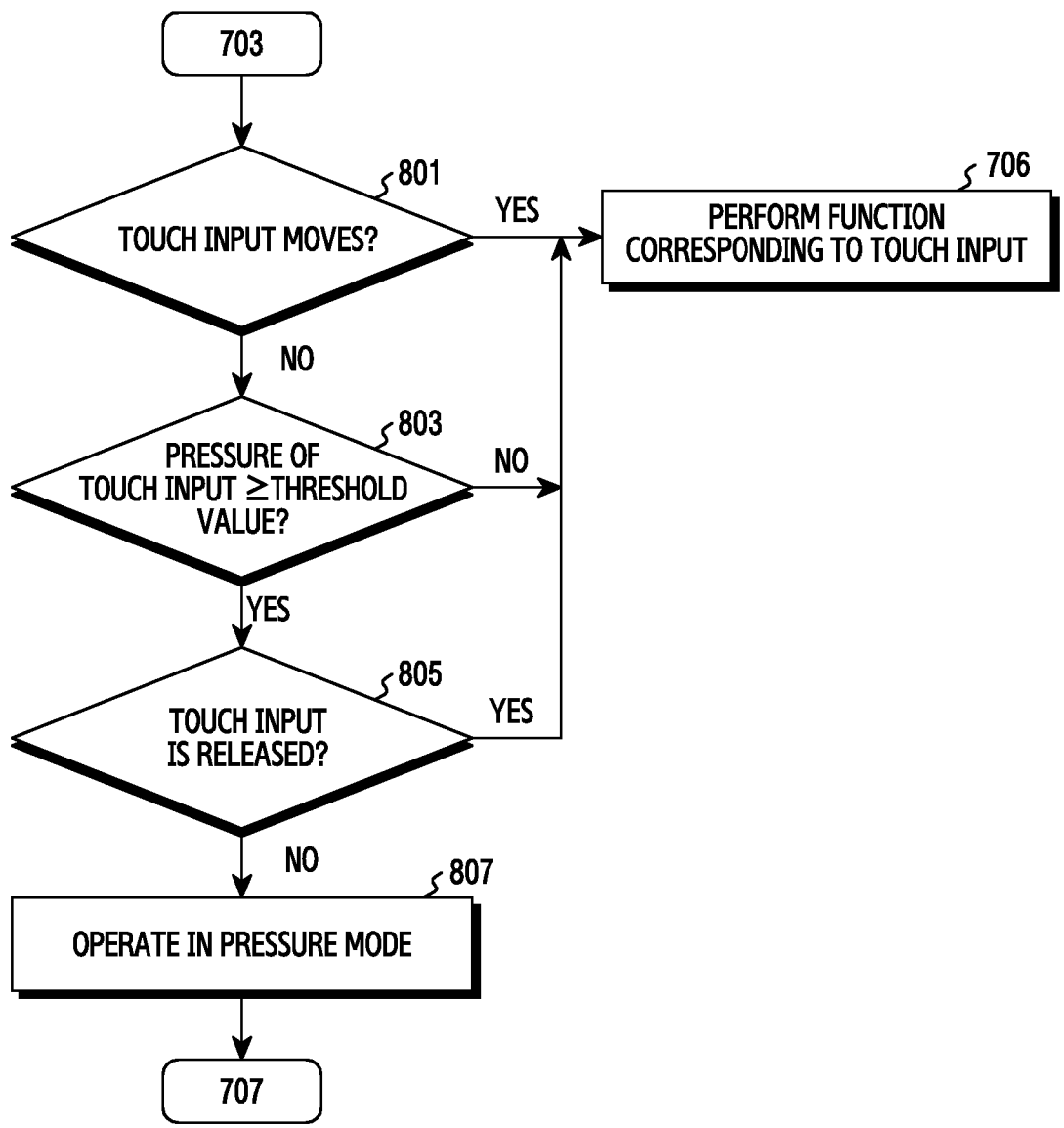
FIGS. 8A and 8B are flowcharts of a method for determining a pressure input in an electronic device, according to an embodiment of the present disclosure.
Figure 8B:
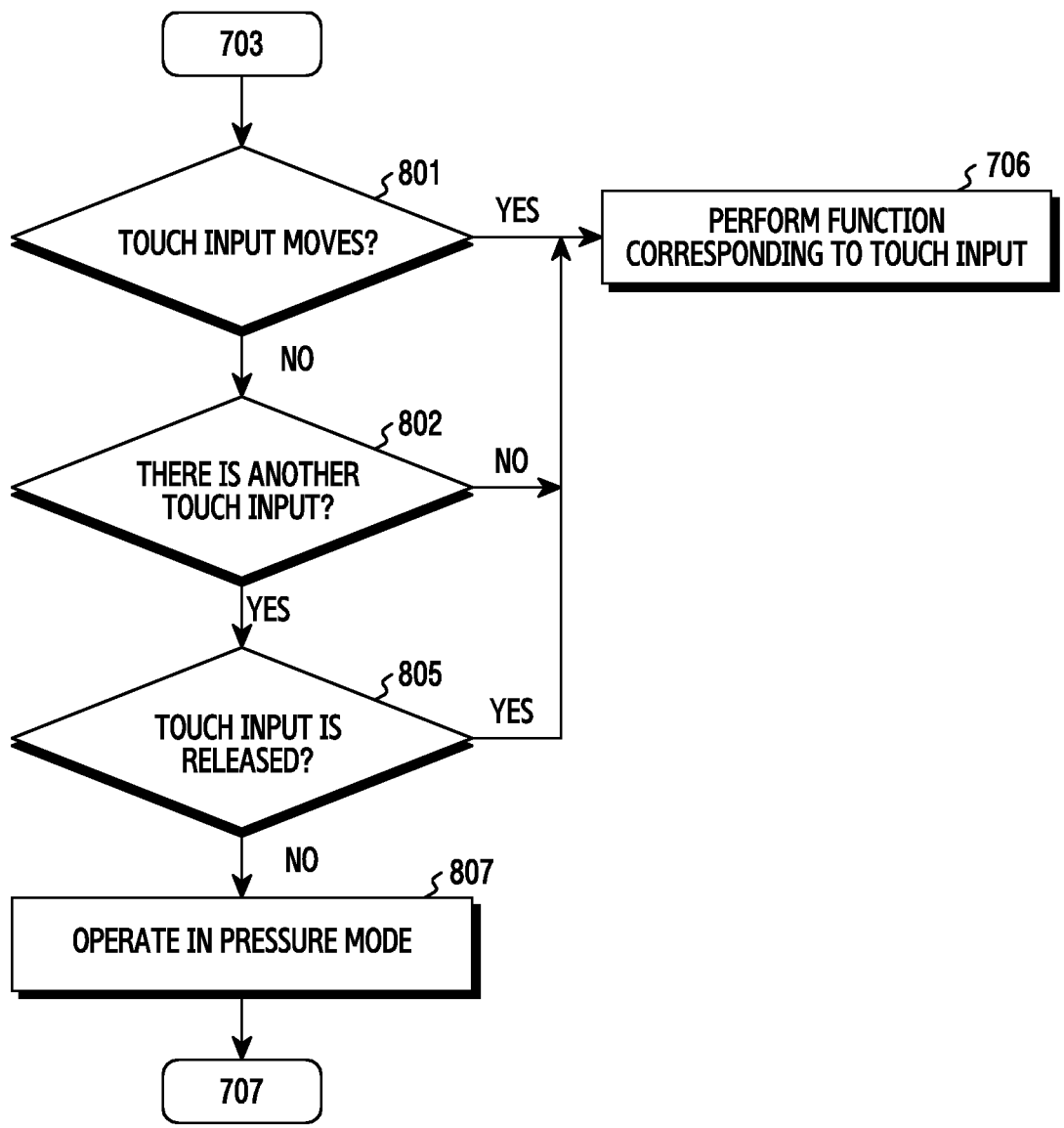

FIGS. 8A and 8B are flowcharts of a method for determining a pressure input in an electronic device, according to an embodiment of the present disclosure.

Referring to FIG. 8A and FIG. 8B, the details of step 705 of FIG. 7 are described in further detail.

FIG. 8A is a flowchart illustrating an operation of the electronic device 101 entering a pressure mode using a single-touch input. In step 801, the processor 120 of the electronic device 101 may determine whether a touch input moves. The processor 120 may determine whether the touch input detected in operation 703 of FIG. 7 moves, and thus determine whether the touch input corresponds to the pressure input.

When the touch input moves, the processor 120 may perform step 706, and when the touch input does not move, the processor 120 may perform step 803. The step 706 is similar to that previously described FIG. 7. For example, when the touch input moves, the processor 120 may perform a function corresponding to the touch input being moved. For example, the processor 120 may perform a function corresponding to a touch and drag.

In step 803, the processor 120 of the electronic device 101 may determine whether the pressure of the touch input greater than or equal to a threshold value. For example, the threshold value may be a reference pressure value that serves as a reference for determining the touch input as the pressure input. The reference value may be set by the user or configured as a default value by the electronic device 101. For example, the threshold value may be set based on the measured value of the maximum pressure of the touch input that is maintained for a predetermined time. The processor 120 may measure the pressure pattern, such as average pressure, maximum pressure, minimum pressure, and the like for a predetermined time from a starting point of the touch input, and determine whether the measured pattern is greater than or equal to the threshold value.

The processor 120 may determine whether the touch input detected in step 703 of FIG. 7 does not move and is detected by the force sensor 440. The processor 120 may determine whether the touch input is detected by the force sensor 440 and the detected pressure greater than or equal to the threshold value. The force sensor 440 may detect an input that is more deeply pressed against the display 430 in a state where the touch input is maintained.

When the pressure is less than the threshold value, the processor 120 may perform step 706, and when the pressure is greater than or equal to the threshold value, the processor 120 may perform step 805. Step 706, described with respect to FIG. 8A, is similar to that previously described with respect to FIG. 7A. For example, when the touch input is less than the threshold value, the processor 120 may perform a function corresponding to the touch input. For example, the processor 120 may perform a function corresponding to a tap touch. When the touch input does not move from the state where the touch input is maintained even though it is detected that the pressure of the touch input is less than the threshold value, the processor 120 may recognize the touch input as the tap touch. For example, if the tap touch is a touch input that lasts for less than one second, the processor 120 may perform a function based on a position where the touch input is detected.

When the touch input does not move from the state where the touch input is maintained even though it is detected that the pressure of the touch input is less than the threshold value, the processor 120 may perform a function that corresponds to a long touch. The long touch may mean that a touch time for the touch display 430 is longer (for example, lasts for more than two seconds) than the tap touch. When the touch input is less than the threshold value, the processor 120 may perform a function corresponding to the long touch.

In step 805, the processor 120 of the electronic device 101 may determine whether the touch input is released. For example, when the touch input detected in step 703 of FIG. 7A does not move, and the pressure detected by the force sensor 440 is greater than or equal to the threshold value, the processor 120 may determine whether the touch input is released or not.

When the touch input is released, the processor 120 may perform step 706, and when the touch input is not released, the processor 120 may perform step 807. Step 706 described with respect to FIG. 8A is similar that previously described with respect to FIG. 7A. For example, when the touch input is released, the processor 120 may perform a function corresponding to the long touch. The long touch may mean that a touch time for the touch display 430 is longer (for example, lasts for more than two seconds) than the tap touch. When step 801 to step 805 are performed and the touch input is released, the processor 120 may recognize the detected touch input as the long touch. Here, the processor 120 may perform a function corresponding to the long touch.

In step 807, the processor 120 of the electronic device 101 may operate in a pressure mode. For example, when the touch input detected in step 703 of FIG. 7 does not move, the pressure detected by the force sensor 440 is greater than or equal to the threshold value, and the touch input is not released, the processor 120 may determine the touch input as the pressure input. The touch input may move without being released. The movement of the touch input may be performed for the handwriting input. When operating in the pressure mode, the processor 120 may receive the handwriting input, and even when the touch input while receiving the handwriting input is released, the processor 120 may recognize the handwriting input through the handwriting input layer.

FIG. 8B is a flowchart illustrating an operation of the electronic device 101 entering a pressure mode using a multi-touch input. The multi-touch input refers to a touch input which is detected at two or more positions (or coordinates) on the display 430 of the electronic device 101. In step 801, the processor 120 of the electronic device 101 may determine whether a touch input moves. Since step 801 is similar to step 801 of FIG. 8A, a detailed description thereof will be omitted.

When the touch input moves, the processor 120 may perform step 706, and when the touch input does not move, the processor 120 may perform step 802. Step 706 is similar to that previously described with respect to FIG. 8A. For example, when the touch input moves, the processor 120 may perform the function corresponding to the touch input being moved.

In step 802, the processor 120 of the electronic device 101 may determine whether there is another touch input, i.e., a second touch input. The second touch input may be a different input distinguished from the touch input, i.e., a first touch input, detected in step 703 of FIG. 7. According to an embodiment, it may not be important whether the first touch input precedes the second touch input, and vice versa. That is, when the multi-touch input (e.g., the first touch input and second touch input) is detected and one (e.g., the first touch input or the second touch input) of the multi-touch inputs neither moves nor is released, the electronic device 101 may operate in pressure mode.

While performing an operation for determining the pressure mode, the processor 120 may determine whether the multi-touch input is detected on the display 430. For example, if the first touch input detected in step 703 is a touch input by a pen, the second touch input detected in step 802 may be a touch input by the user's body, that is, a finger.

When the second touch input is detected, the processor 120 may perform step 805, and when the second touch input is not detected, the processor 120 may perform step 706. Here, step 706 is similar that previously described with respect to FIG. 8A. For example, when the second touch input is not detected, the processor 120 may perform a function corresponding to the first touch input. For example, the processor 120 may perform a function corresponding to a tap touch.

In step 805, the processor 120 of the electronic device 101 may determine whether the first touch input is released. For example, when the first touch input detected in step 703 of FIG. 7 does not move and there is a second touch input in step 802, the processor 120 may determine whether the first touch input is released.

When the first touch input is released, the processor 120 may perform the step 706, and when the first touch input is not released, the processor 120 may perform step 807. Here, step 706 is similar that previously described with respect to FIG. 8A. For example, when the first touch input is released, the processor 120 may perform a function corresponding to the multi-touch input, on the basis of the first touch input detected in step 703 and the second touch input detected in step 802.

In step 807, the processor 120 of the electronic device 101 may operate in a pressure mode. For example, when the first touch input detected in step 703 of FIG. 7 does not move, and there is a second touch input and the first touch input is not released, the processor 120 may operate in the pressure mode.

Figure 9:
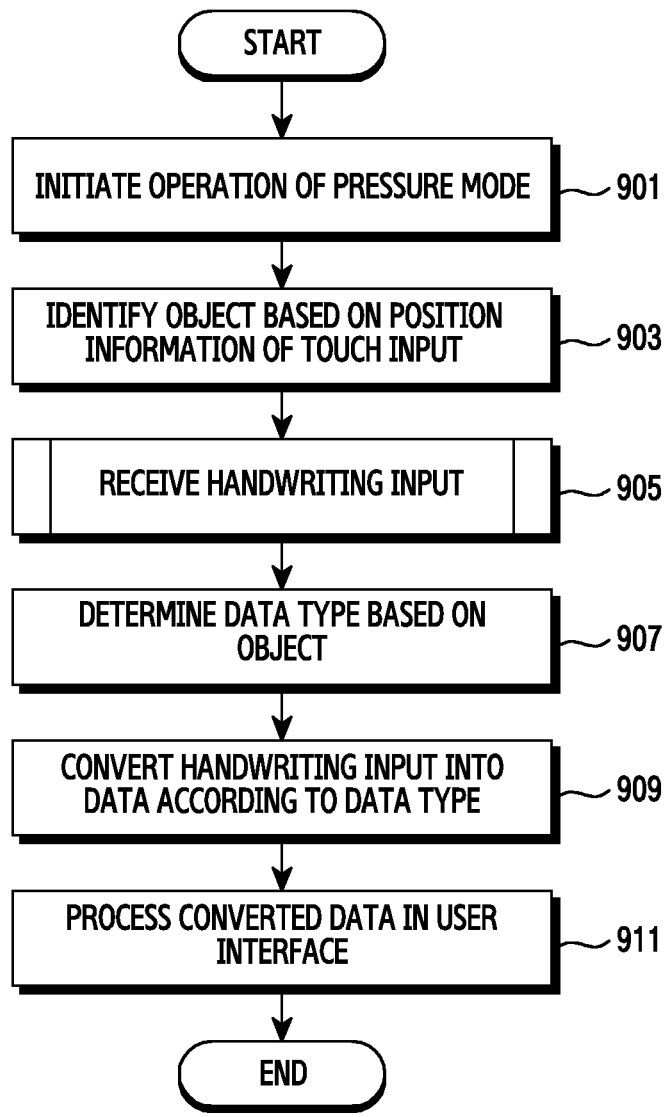
FIG. 9 is a flowchart of a method for processing a user interface using a pressure in an electronic device, according to an embodiment of the present disclosure.

FIG. 9 is a flowchart of a method for processing a user interface using a pressure in an electronic device, according to an embodiment of the present disclosure.

Referring to FIG. 9, in step 901, the processor 120 of the electronic device 101 may initiate step of a pressure mode. In the pressure mode, the processor 120 may distinguish a layer that receives a handwriting input (e.g., a first layer) and a layer that displays the handwriting input (e.g., a second layer). For example, the first layer may be disposed on the second layer, and may receive the handwriting input. In addition, the second layer may be a layer on which the user interface is displayed.

In step 903, the processor 120 of the electronic device 101 may identify an object based on the position information of a touch input. The object is an element for configuring the user interface, and may be at least one of text, images, pictures, videos, and buttons. The text may be an area where text is displayed or an input field (input window) into which text (or image) is inserted. The processor 120 may identify an object disposed at a position where the touch input is detected.

In step 905, the processor 120 of the electronic device 101 may receive the handwriting input. The handwriting input may not be a character input through the keypad (or keyboard) but a character, number, symbol, etc., which is directly input by the user. The processor 120 may activate the first layer that receives the handwriting input and recognize the handwriting style input from the first layer. The processor 120 may determine the first layer as an entire area of the display 430, or may determine the first layer as a portion of the display 430 based on the position where the touch input is generated. For example, when the touch input is detected in the input field, and even when the handwriting input is detected outside of the input field, the processor 120 may recognize the touch or the pressure that is input on the first layer as the handwriting input.

In step 907, the processor 120 of the electronic device 101 may determine a data type based on the object. The data type may be at least one of text, images, and videos.

For example, when the object is the input field for inputting text or images, the processor 120 may determine the data type as the text or images.

For example, when the object is an image, the processor 120 may determine the data type as images.

For example, when the object is a button, the processor 120 may determine the data type as text or images based on the attribute information of the object. In this case, the processor 120 may further determine a function to process the handwriting input based on attribute information of the object. In this case, when the handwriting input is completed, the processor 120 may transmit (or share, register) data corresponding to the handwriting input.

In step 909, the processor 120 of the electronic device 101 may convert the handwriting input into data according to a data type thereof. For example, when the data type corresponds to text, the text can be separated as a general text type or a security text type. For the general text type, the processor 120 may convert data corresponding to the handwriting input into text or images. For the security text type, the processor 120 may convert data corresponding to the handwriting input into only text. In addition, for the security text type, the processor 120 may convert data corresponding to the handwriting input into symbols (e.g., *, #). Alternatively, the processor 120 may convert data corresponding to the handwriting input into images or video.

In step 911, the processor 120 of the electronic device 101 may process data that is converted in the user interface. For example, the processor 120 may input text corresponding to the handwriting input to the input field in the user interface. Alternatively, the processor 120 may input images corresponding to the handwriting input to the input field in the user interface. Additionally, the processor 120 may transmit (or register) at least one of text, images, or video corresponding to the handwriting input to a chatting field in the user interface.

Accordingly, when the object is an image, the processor 120 may convert stroke data into bitmap data on the image. When the object is a text box, the processor 120 may convert the stroke data into Unicode data. When the object is a button for executing a particular function and the function mapped to the button corresponds to the performance of the text input, the processor 120 may determine the data type as text to convert the same.

The processor 120 may process the converted data in conjunction with the object by inputting text into the text box, merging the bitmap data into the image, and when the function mapped to the button corresponds to transmitting a message to a particular target, transmitting the message to the particular target using the converted text as a parameter.

Figure 10:
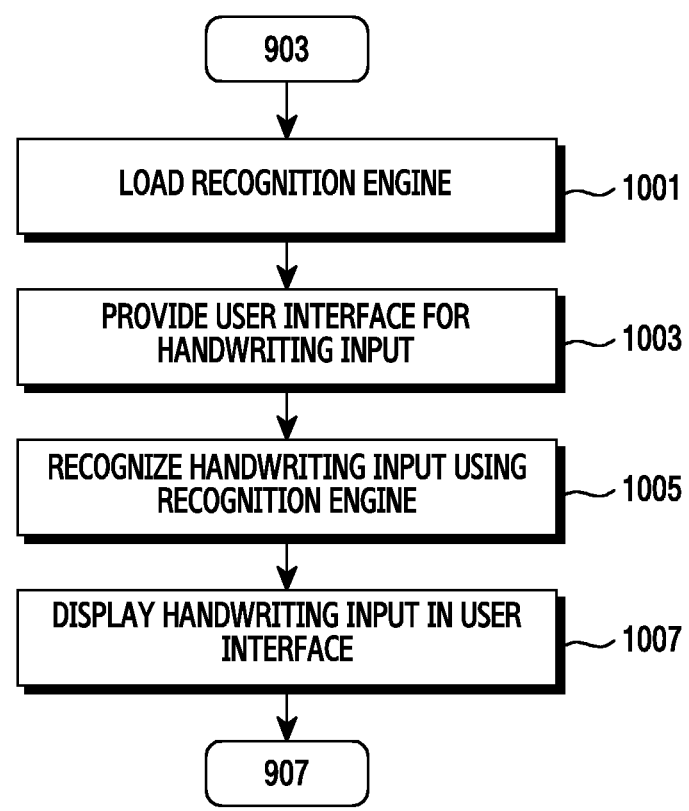
FIG. 10 is a flowchart of a method for processing a handwriting input in an electronic device, according to an embodiment of the present disclosure.

FIG. 10 is a flowchart of a method for processing a handwriting input in an electronic device, according to an embodiment of the present disclosure.

Referring to FIG. 10, the details of step 905 of FIG. 9 are described in further detail. In step 1001, the processor 120 of the electronic device 101 may load a recognition engine. The recognition engine may be a program for recognizing the handwriting input. The processor 120 may load the recognition engine onto the memory 130 and execute the same.

In step 1003, the processor 120 of the electronic device 101 may provide the user interface for the handwriting input. The user interface may be separated into a first layer and a second layer, receive the handwriting input through the first layer, and display a user interface screen through the second layer. An end button for terminating the handwriting input may be included on the first layer.

In step 1005, the processor 120 of the electronic device 101 may recognize the handwriting input using the recognition engine. A recognition method (e.g., character recognition, segmentation, language modeling) for the handwriting input using the recognition engine may be performed using the steps of FIG. 7B.

In step 1007, the processor 120 of the electronic device 101 may display the handwriting input in the user interface. For example, the processor 120 may receive the handwriting input through the first layer and display the received handwriting input through the second layer.

The processor 120 may receive the handwriting input and display the same until the end button on the first layer is selected. When the handwriting input is not received for a certain period of time, the processor 120 may terminate the reception of the handwriting input. Alternatively, when buttons (for example, a transmission button, a shared button, etc.) on the second layer are selected after handwriting input, the processor 120 may terminate the reception of the handwriting input. For example, the processor 120 may determine that the button is selected when the button on the second layer receives a long touch. When the handwriting input is made, the button on the second layer may be selected regardless of the user's intention. In order to distinguish a case where the button on the second layer is selected by mistake during the handwriting input, the processor 120 may ignore a case where the button on the second layer receives a short touch (e.g., the tap touch) and determine that the button is selected when the button receives the long touch.

Figure 11:
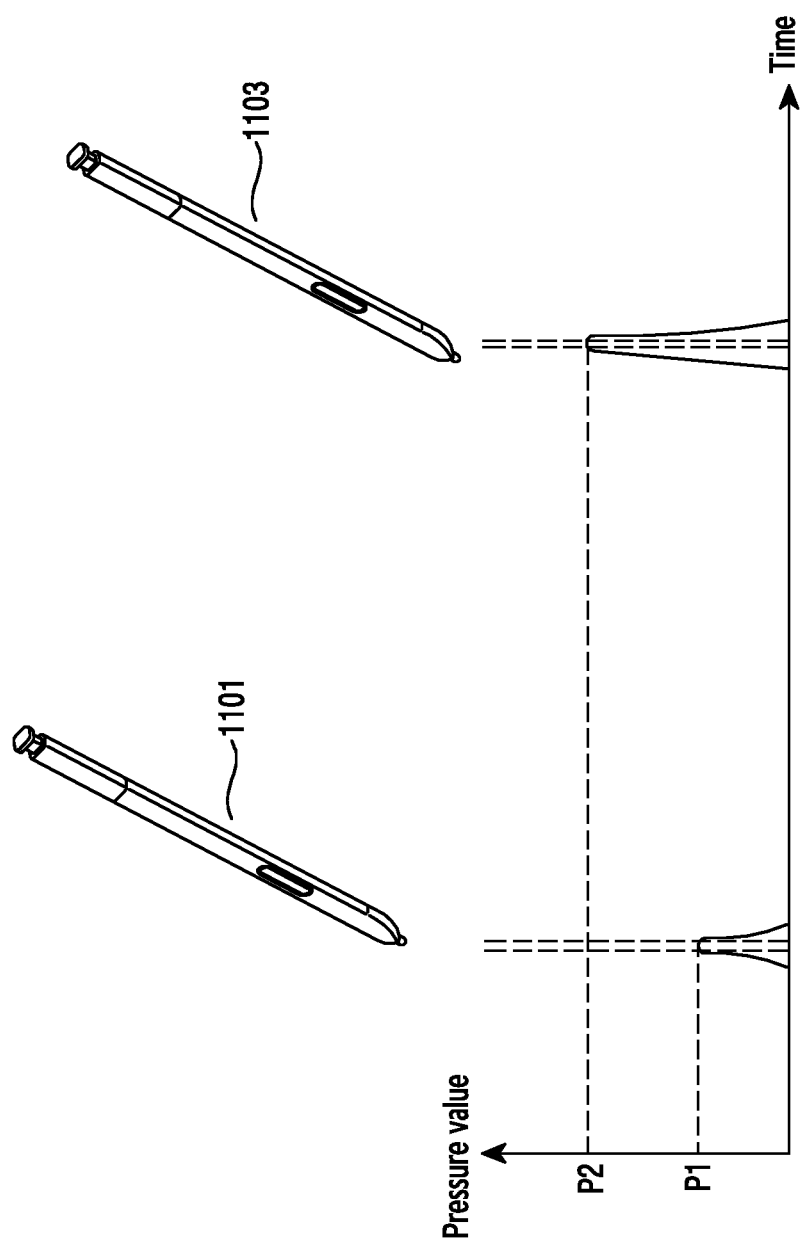
FIG. 11 is a graph illustrating a method of detecting a pressure of a handwriting input in an electronic device, according to an embodiment of the present disclosure.

FIG. 11 is a graph illustrating a method of detecting a pressure of a handwriting input in an electronic device, according to an embodiment of the present disclosure.

Referring to FIG. 11, the processor 120 of the electronic device 101 may calculate a pressure value as 'P1', which is pressed by a touch pen 1101 against the display 430. The pressure value 'P1' is a general pen pressure, and may be the minimum pressure detected by the force sensor 440 or the first pressure signal received from the touch pen 1101. Alternatively, the pressure value 'P1' may not be detected by the force sensor 440, and may correspond to the touch input detected by the touch sensor 420.

The processor 120 of the electronic device 101 may calculate a pressure value as 'P2', which is pressed by the touch pen 1103 against the display 430. The pressure value 'P2' is a general pen pressure, and may be the maximum pressure detected by the force sensor 440 or the maximum pressure signal received from the touch pen 1101. The pressure value 'P2' may be a value by which the pressure input is detected by the force sensor 440 in a state where the touch input is detected by the touch sensor 420 and then the touch input is maintained.

The pressure value 'P1' may have a pressure strength smaller than the pressure value 'P2'. The processor 120 may set a threshold value for determining the pressure input on the basis of the pressure value of 'P1' and the pressure value 'P2'.

Figure 12:
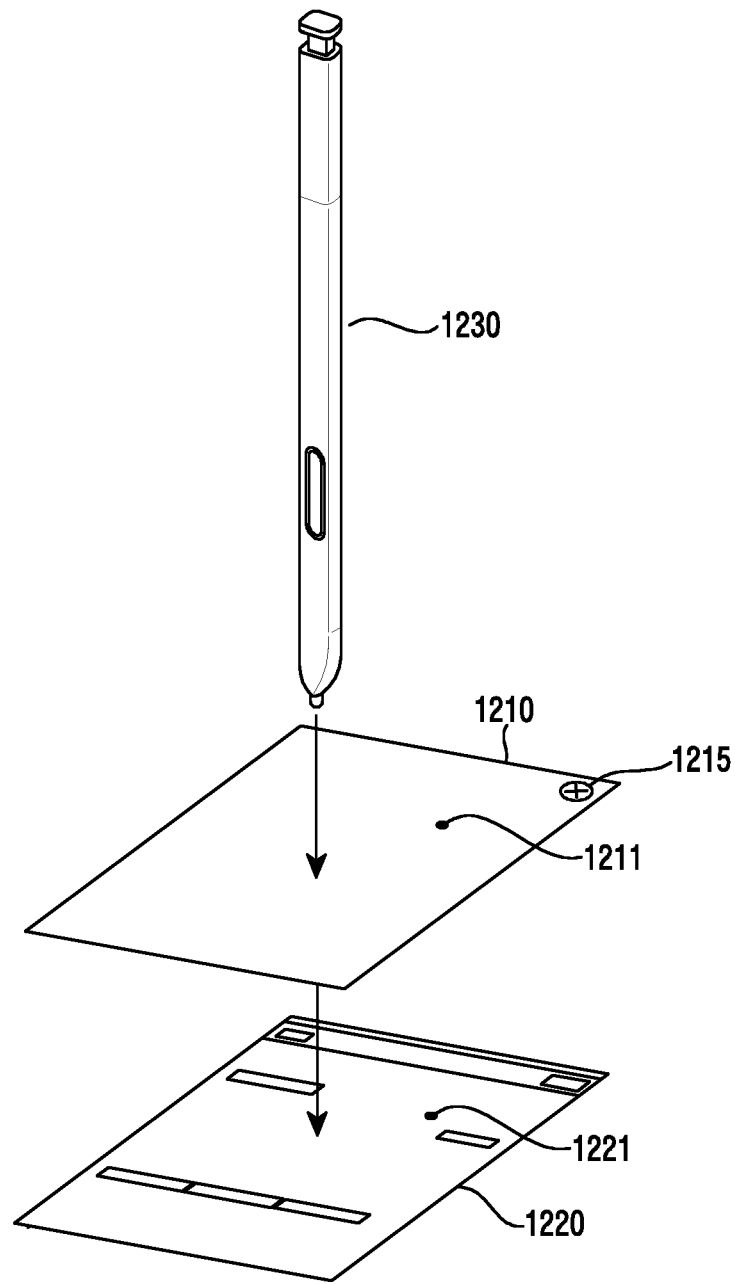
FIG. 12 is a diagram illustrating a method of processing a handwriting input in an electronic device, according to an embodiment of the present disclosure.

FIG. 12 is a diagram illustrating a method of processing a handwriting input in an electronic device, according to an embodiment of the present disclosure.

Referring to FIG. 12, the processor 120 of the electronic device 101 may separate a first layer 1210 for recognizing the handwriting input in the pressure mode and a second layer 1220 for displaying the handwriting input. When the user provides a handwriting input using an external object (e.g., a touch pen 1230 or the user's body), the processor 120 may receive the handwriting input at a first touch point 1211 on the first layer 1210, and display the handwriting input on a second touch point 1221 on the second layer 1220. For example, the processor 120 may select an object on the first layer 1210 and convert data on the second layer 1220. That is, the first touch point 1211 on the first layer 1210 may be a point on which the object is disposed. In addition, the first touch point 1211 may be a point in which the handwriting input is started. The first layer 1210 and second layer 1220 may each correspond to the display 430. The first layer 1210 and second layer 1220 may be disposed by being superposed on each other. Accordingly, the touch point 1211 of the first layer 1210 and the touch point 1221 of the second layer 1220 may correspond to each other.

The first layer 1210 may correspond to a portion of the second layer 1220. That is, the first layer 1210 may recognize the handwriting input and may not correspond to the entire area of the second layer 1220 that displays the user interface. For example, the first layer 1210 may correspond to a portion of the display 430, and the second layer 1220 may correspond to the entire area of the display 430.

The processor 120 may activate a first layer 1210 in a pressure mode. An end button 1215 for terminating the handwriting input may be displayed on the first layer 1210.

When the end button 1215 is selected, the processor 120 may deactivate the first layer 1210. That is, if not in the pressure mode, the first layer 1210 is deactivated and the processor 120 may display the user interface, and the second layer 1220 may recognize the function according to the touch input detected in the user interface and display the same.

FIGS. 13 to 18 illustrate user interfaces for processing a handwriting input in an electronic device, according to an embodiment of the present disclosure.

Figure 13:
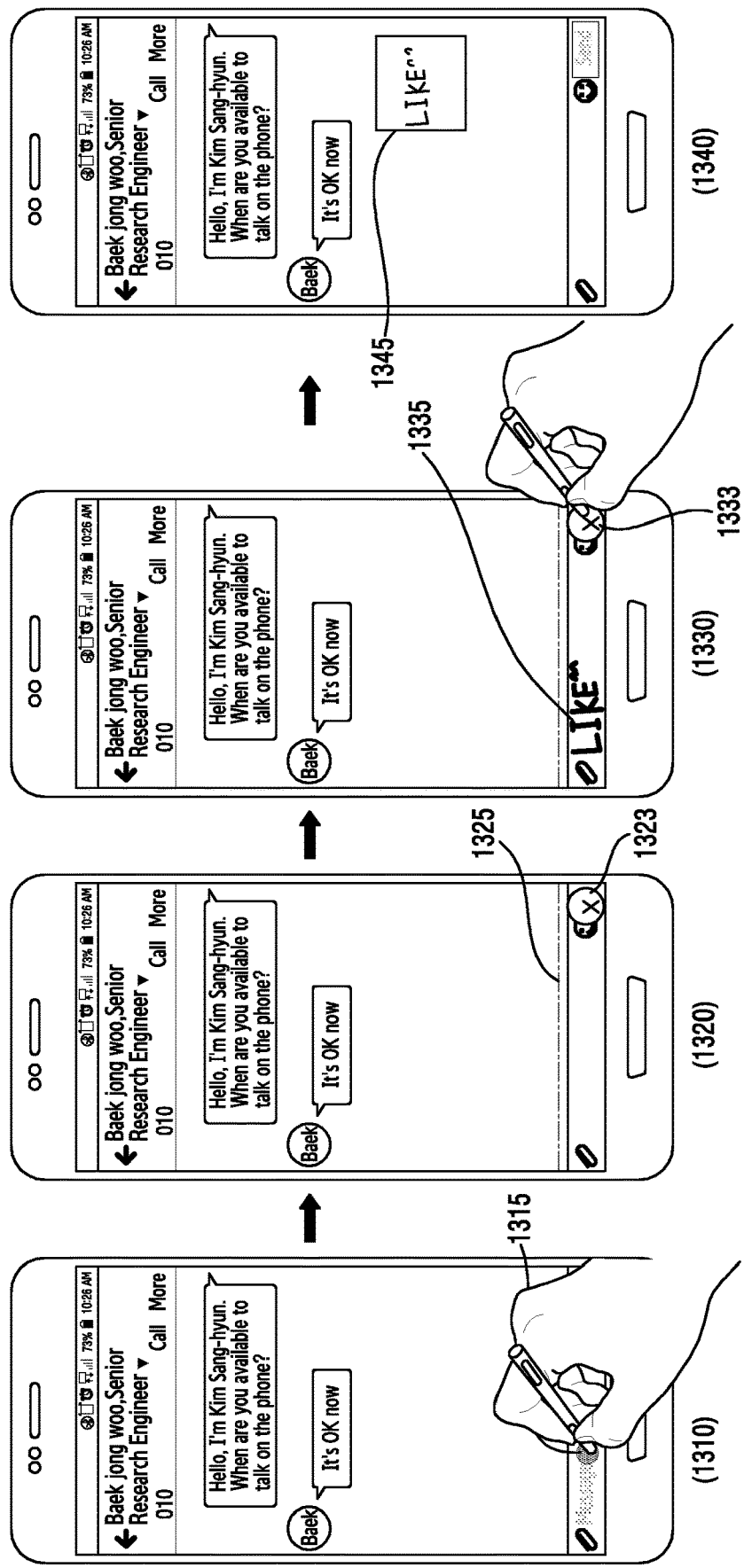

Referring to FIG. 13, a user interface for processing the handwriting input in a message application of the electronic device 101 is provided. The processor 120 of electronic device 101 may detect a user input 1315 in a first user interface 1310 for the message application. The user input 1315 may include the touch input or pressure input when the user's body or the touch pen presses the display 430. The first user interface 1310 may include a chat content display area and an input area (or input field) thereof. The processor 120 may determine whether the user input 1315 corresponds to the pressure input, and when the user input 1315 corresponds to the pressure input, the processor may identify an object based on the position where the user input 1315 is detected. The object may be the input area.

When the user input 1315 corresponds to the pressure input, the processor 120 may provide a second user interface 1320 that has activated the first layer 1325 for receiving the handwriting input. The user interface 1320 is separated into the first layer 1325 for receiving the handwriting input and the second layer for displaying the handwriting input. The processor 120 may activate the first layer 1325. The first layer 1325 may include an end button 1323 for terminating the handwriting input. The second user interface 1320 may be displayed on the second layer. The first layer 1325 may be disposed on a portion of the second layer. For example, the first layer 1325 may correspond to the input area on the second user interface 1320.

The processor 120 may provide a third user interface 1330 where the first layer recognizes the handwriting input and the handwriting input is displayed on the second layer. In the third user interface 1330, the handwriting input 1335 may be displayed on the input area and the end button 1333 may be displayed on the first layer.

When the end button 1333 is selected (touched) in the third user interface 1330, the processor 120 may provide a fourth user interface 1340. For example, when the end button 1333 is selected in the third user interface 1330, the processor 120 may provide the fourth user interface 1340 where a handwriting input 1345 is registered on the chat content display area. That is, processor 120 may transmit the handwriting input 1345 recognized on the first layer to a counterpart electronic device only if the end button 1333 is selected. Alternatively, when the end button 1333 is selected, the processor 120 may deactivate the first layer, and when a transmission button is included in the third user interface 1330, the processor 120 may register the handwriting input 1345 on the chat content display area. That is, the processor 120 may transmit the handwriting input 1345 recognized on the first layer to a counterpart electronic device when the end button 1333 is selected and then the transmission button is selected.

The processor 120 may determine a data type based on the object where the touch input is detected, convert data corresponding to the handwriting input 1345 according to the determined data type, and transmit the converted data to the counterpart electronic device. For example, when the object where the touch input is detected corresponds to the input area, the processor 120 may determine one of text and images as the data type and convert the data corresponding to the handwriting input into the text or images. In the fourth user interface 1340, the data corresponding to the handwriting input 1345 may be images.

The processor 120 may determine the data type according to the user's preference or the user's setting. That is, when the object corresponds to the input area, the text or images may be determined as the data type, and the processor 120 may determine the data type according to the user's preference (e.g., a frequency of use) or the user's setting. When the data type to which the user's preference is reflected corresponds to images, the processor 120 may convert the data corresponding to the handwriting input to the images. Alternatively, when the object corresponds to the input area, the processor 120 may convert the data corresponding to the handwriting input to text based on the user's setting.

Figure 14:
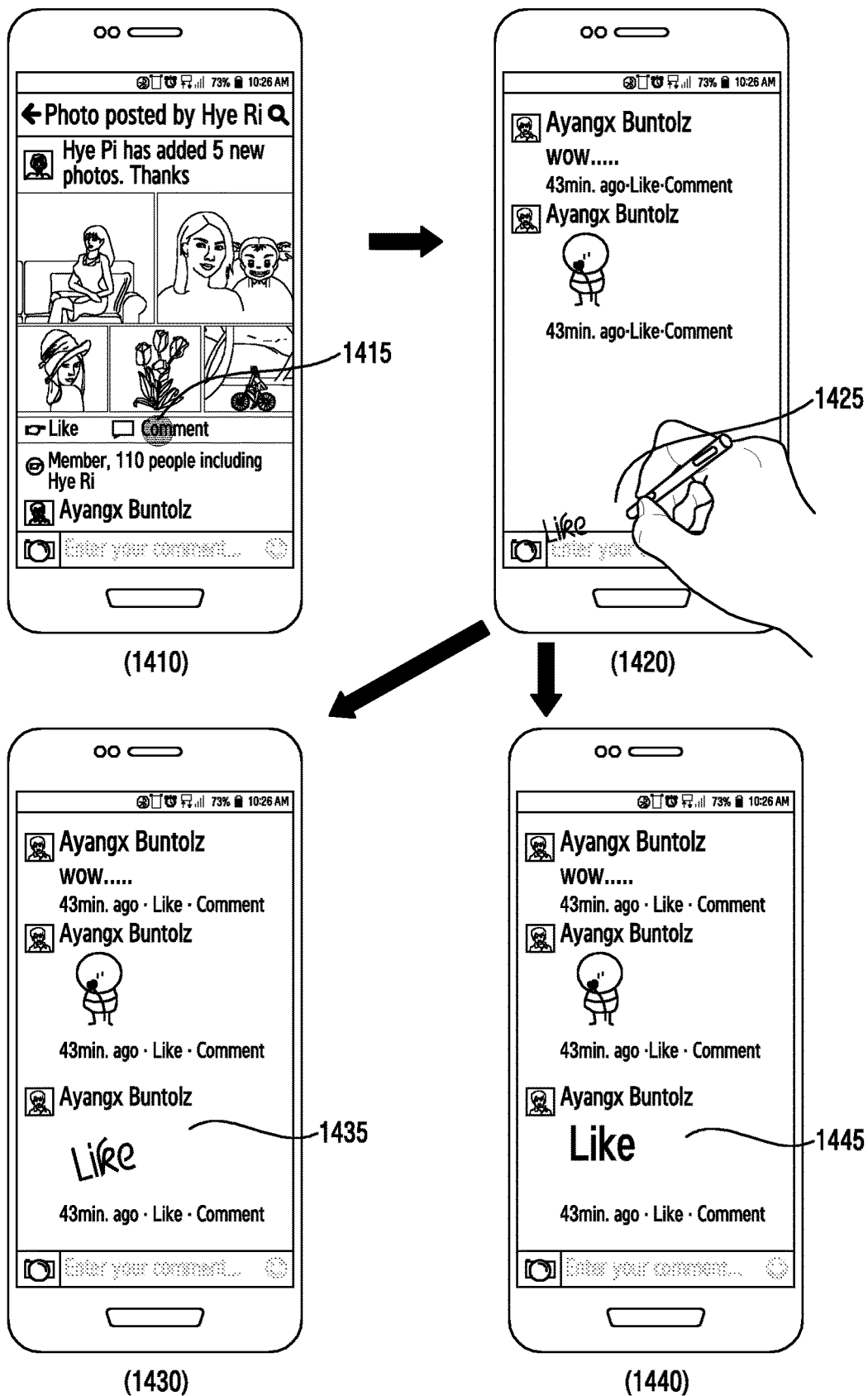

Referring to FIG. 14, a user interface for processing a handwriting input in a shared application of the electronic device 101 is provided. The processor 120 of the electronic device 101 may detect a user input 1415 in the first user interface 1410 for the shared application. The user input 1415 may include the touch input or pressure input when the user's body or the touch pen presses the display 430. The first user interface 1410 may include a shared counterpart, a shared image (e.g., picture), shared text (e.g., comments), and a button. The processor 120 may determine whether the user input 1415 corresponds to the pressure input, and when user input 1415 corresponds to the pressure input, the processor 120 may identify an object based on the position where the user input 1415 is detected. The object may be a comment button.

When the user input 1415 corresponds to the pressure input, the processor 120 may provide a second user interface 1420 that has activated the first layer for receiving the handwriting input. The second user interface 1420 is separated into the first layer for receiving the handwriting input and the second layer for displaying the handwriting input, and may activate the first layer. The second user interface 1320 may be displayed on the second layer. The first layer may correspond to the entire area of the second layer or a portion thereof. In the second user interface 1420, the first layer may correspond to the entire area of the second layer. The processor 120 may receive, on the first layer, the handwriting input 1425.

When the handwriting input is completed in the second user interface 1420 (e.g., the end button is selected), the processor 120 may provide the third user interface 1430 or the fourth user interface 1440. For example, when the object where the touch input is detected corresponds to a button, the processor 120 may determine one of text and images as a data type based on attribute information of the object and convert the data corresponding to the handwriting input into the text or images. In the third user interface 1430 data corresponding to the handwriting input is converted into image data 1435. In the fourth user interface 1440 data corresponding to the handwriting input is converted into text data 1445.

Figure 15:
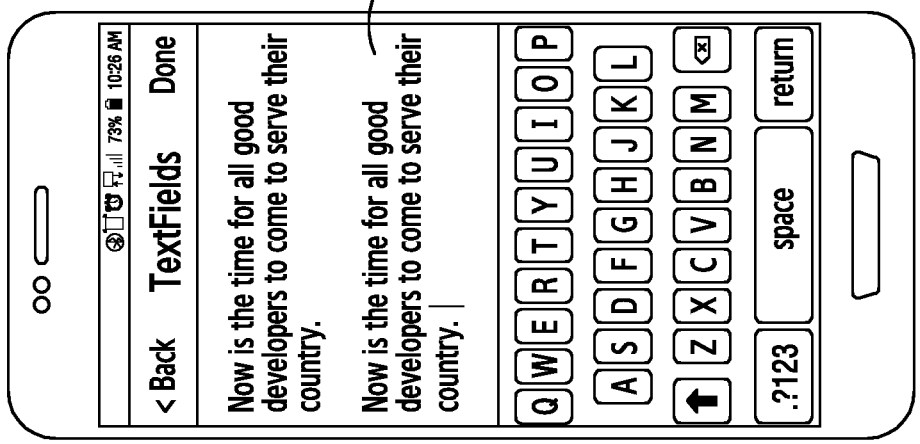
Figure 15:
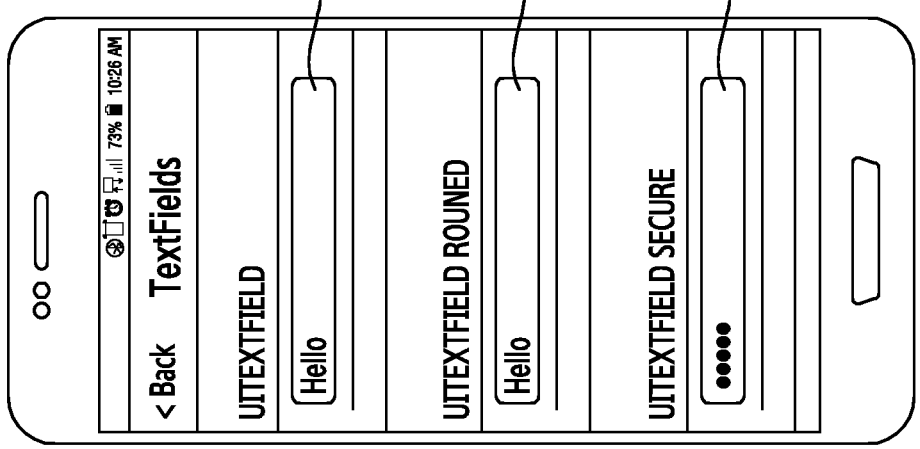

Referring to FIG. 15, a user interface for processing a handwriting input in a web service-related application of the electronic device 101 is provided. The processor 120 of the electronic device 101 may display a first user interface 1510 for the web service-related application. The first user interface 1510 may include a first input field 1513, a second input field 1515, and a third input field 1517. The processor 120 may determine an object in the first user interface 1510 or attribute information of the object on the basis of information for displaying a web page (e.g., hypertext markup language (HTML), cascading style sheets (CSS), and JavaScript).

For example, the first input field 1513, the second input field 1515, and the third input field 1517 may have the same data type as "Text". However, the third input field 1517 may be a text type different from the first input field 1513 and the second input field 1515. For example, when the first input field 1513 and the second input field 1515 correspond to a general text type and only the text within a specified number (for example, one line, 10 characters) can be input, and text is input, then the input text can be displayed. The third input field 1517 corresponds to a security text type, and when text is input, the input text can be converted to a symbol (e.g., *, #). The processor 120 may differently convert data depending on whether the pressure input for the handwriting input is detected from one of the first input field 1513 to the third input field 1517.

The processor 120 of the electronic device 101 may display a second user interface 1520 for the web service-related application. The second user interface 1520 may include an input field 1525 and an input device (e.g., keypad). When the input field 1525 corresponds to a general text type and only the text within a specified number (for example, multiple lines) can be input, and text is input, then the input text can be displayed. When the pressure input for the handwriting input is detected from the input field 1525, the processor 120 may remove the input device and provide a user interface for the handwriting input.

Figure 16:
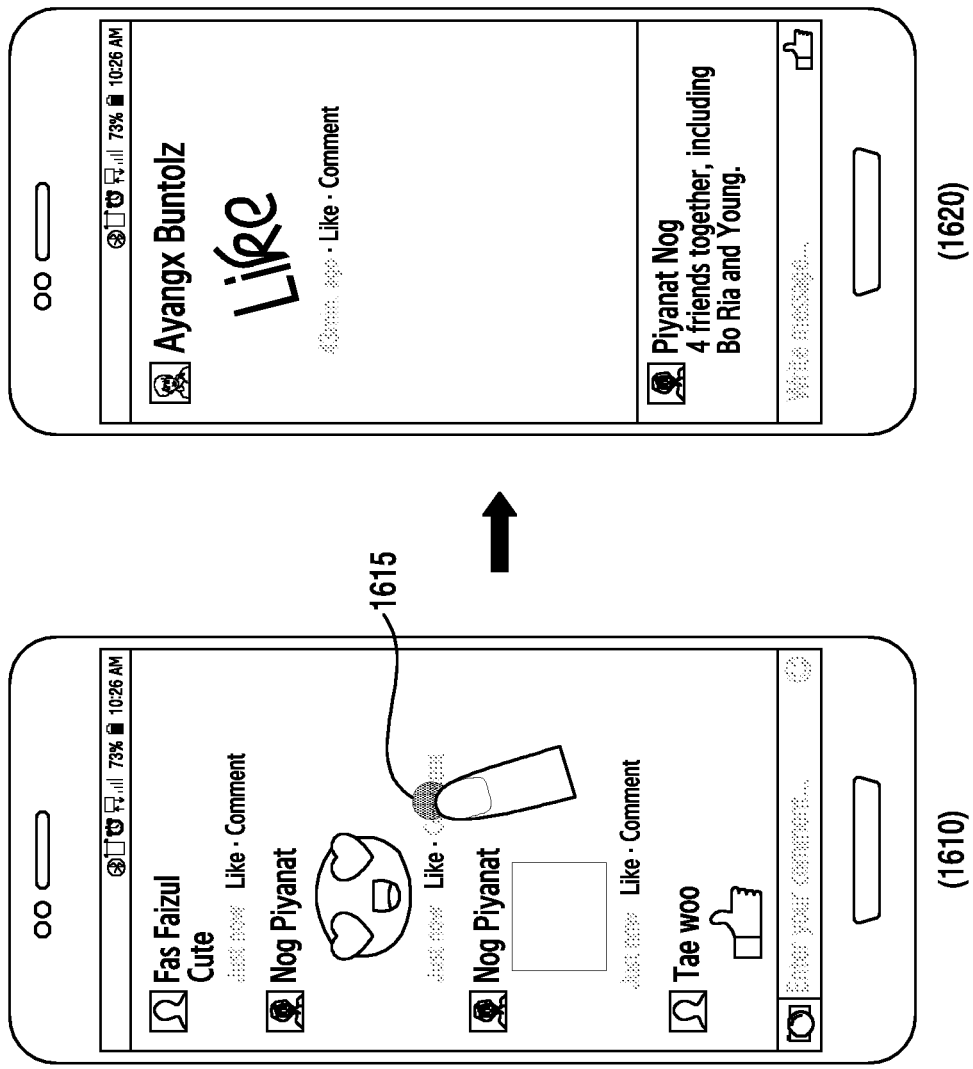

Referring to FIG. 16, a user interface for processing a handwriting input in a shared application of the electronic device 101 is provided. The processor 120 of the electronic device 101 may display a first user interface 1610 for creating a comment for the shared application. The first user interface 1610 may include information (e.g., name) on a counterpart who has registered the comment, comments (e.g., text or emoticons), and a button (e.g., like, comment). The processor 120 may detect a pressure input 1615 on the button in the first user interface 1610. The processor 120 may recognize parameter attributes by mapping the pressure input to a function performed by the button, and may perform the function based on the parameter attributes. For example, the parameter attributes may be the user application ID, a shared counterpart, and the handwriting of the electronic device 101, and the function corresponding to the parameter may publish data corresponding to the handwriting input to the shared counterpart device. When the pressure input 1615 is detected, the processor 120 may display a user interface that separates a layer for receiving the handwriting input and a layer for displaying the handwriting input. The processor 120 may display, when the handwriting input is completed, a second user interface 1620 that has transmitted data (e.g., images, text) corresponding to the handwriting input to the shared counterpart device.

Figure 17:
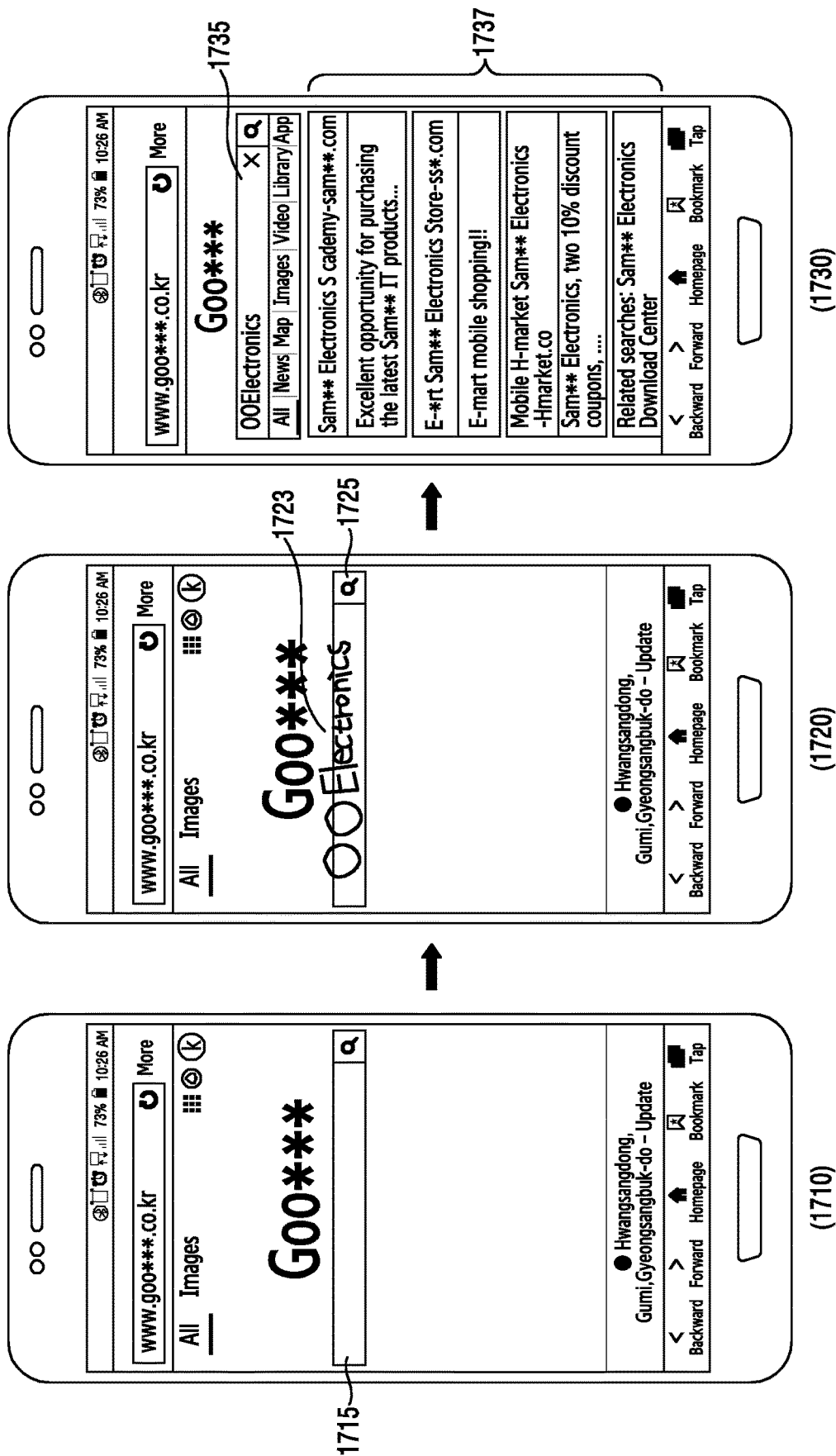

Referring to FIG. 17, a user interface for processing a handwriting input in a search application of the electronic device 101 is provided. The processor 120 of the electronic device 101 may display a first user interface 1710 for the search application. The first user interface 1710 may include an input field 1715. The processor 120 may identify an object (e.g., input field, button, etc.) on the basis of configuration information (e.g., HTML, CSS, and JavaScript) for configuring the first user interface 1710, and may determine attribute information of the object. When the pressure input is detected in the input field 1715 of the first user interface 1710, the processor 120 may provide a second user interface 1720. The second user interface 1720 may be separated into the first layer for receiving the handwriting input and the second layer for displaying the handwriting input. The processor 120 may receive a handwriting input 1723 through the first layer in the second user interface 1720 and display the handwriting input 1723 through the second layer 1723. When a search button 1725 receives a long touch, or an end button on the first layer is selected, the processor 120 may perform a search operation using text corresponding to the handwriting input 1723. When the search button 1725 is selected on the second user interface 1720, the processor 120 may provide a third user interface 1730. The third user interface 1730 may include a search page 1737 founded on the basis of handwriting input 1335.

Figure 18:
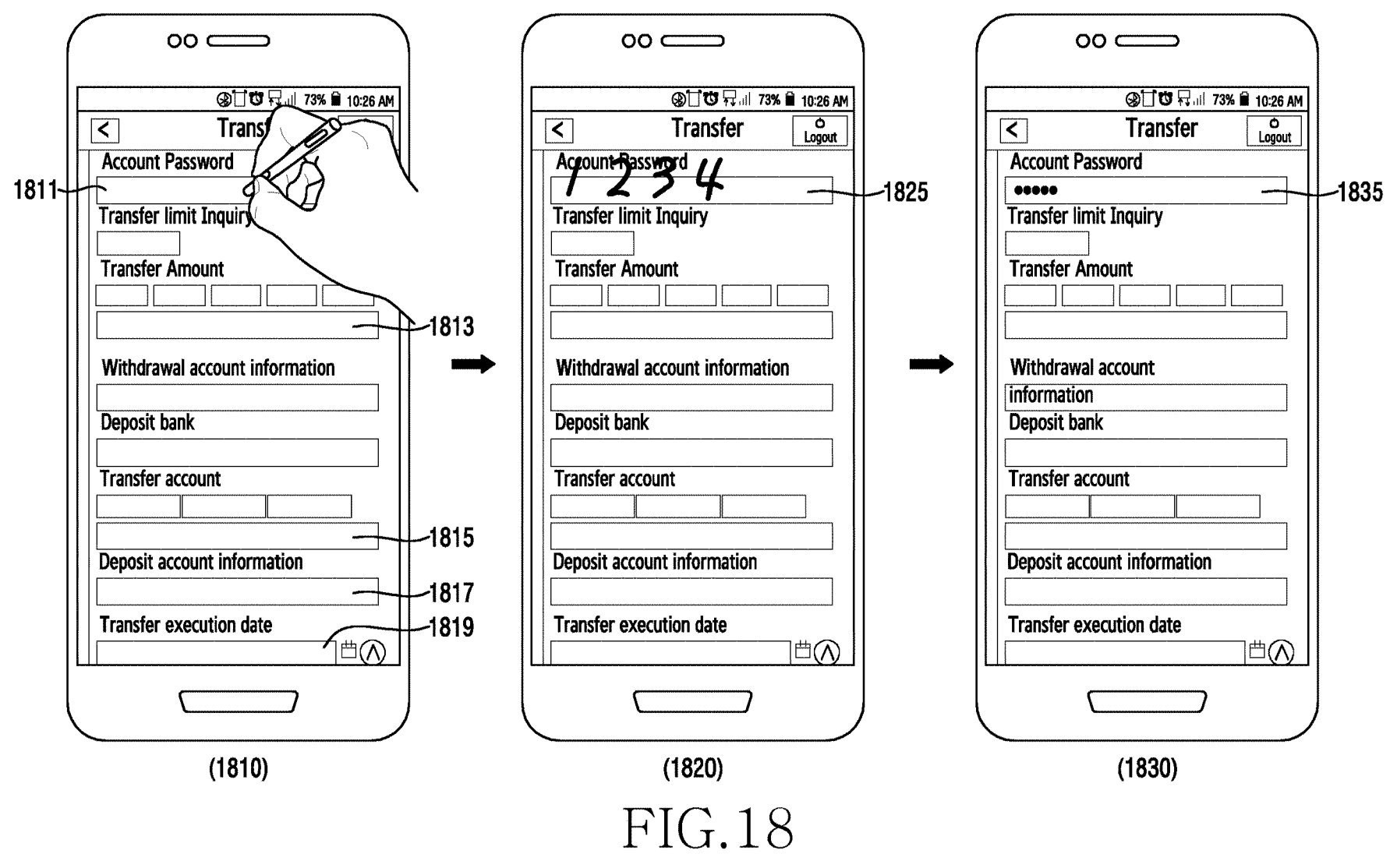

Referring to FIG. 18, a user interface for processing a handwriting input in a finance application of the electronic device 101 is provided. The processor 120 of the electronic device 101 may display a first user interface 1810 for the finance application. The first user interface 1810 may relate to a bank account transfer, and may include a first input field 1811, a second input field 1813, a third input field 1815, a fourth input field 1817, and a fifth input field 1819. The processor 120 may identify a data type of the input field, using configuration information (e.g., HTML, CSS, JavaScript) configuring the first user interface 1810. For example, although all of the data types of the first input field 1811 to the fifth input field 1819 correspond to text, it may be identified that the first input field 1811 to the third input field 1815 may input only numbers, and the fourth input field 1817 may input both numbers and characters.

The processor 120 of the electronic device 101 may display a second user interface 1820 when a pressure input is detected in the first input field 1811. The second user interface 1820 may be separated into a first layer for receiving the handwriting input and a second layer for displaying the handwriting input. The processor 120 may receive the handwriting input 1825 through the first layer in the second user interface 1820. At this time, the processor 120 may identify that the first input field 1811 is a security text type, and may provide the third user interface 1830 when displaying the handwriting input through the second layer. In the third user interface 1830, data 1835 corresponding to the handwriting input 1825 may be converted into a symbol and then the symbol is displayed. The processor 120 may convert text that is input to the first input field 1811 into a symbol depending on the security text type of the first text input field 1811, and then display the symbol, so that the information can be protected.

Only the number of characters selected for each input field may be input to the first input field 1811 to fifth input field 1819. When the number of characters to be input to the respective input fields corresponds to the number selected for each input field, the processor 120 may automatically move an input cursor to the next input field. The data corresponding to the handwriting input may be input to the input field where the cursor is located, and when there are multiple input fields, there may be an inconvenience in that the input cursor should be located in each input field several times. Thus, when the selected number of characters is input to each input field, the processor 120 may automatically move the input cursor to the next input field so that the user convenience can be improved.

Figure 19:
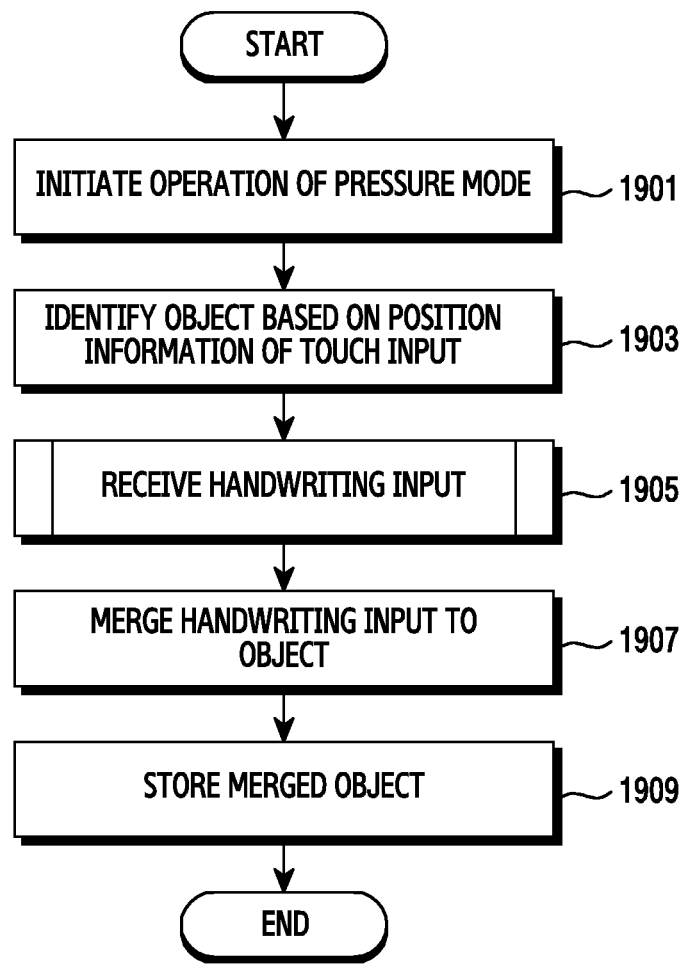
FIG. 19 is a flowchart of a method for processing a handwriting input in an electronic device, according to an embodiment of the present disclosure.

FIG. 19 is a flowchart of a method for processing a handwriting input in an electronic device, according to an embodiment of the present disclosure.

Referring to FIG. 19, in step 1901, the processor 120 of the electronic device 101 may initiate a pressure mode. In the pressure mode, the processor 120 may separate a layer for receiving a handwriting input (e.g., a first layer) and a layer for displaying the handwriting input (e.g., a second layer). Since step 1901 is similar to step 901 of FIG. 9, a detailed description thereof will be omitted.

In step 1903, the processor 120 of the electronic device 101 may identify an object based on the position information of the touch input. The object is an element for configuring the user interface, and may be at least one of text, images, pictures, video, and buttons. Since step 1903 is similar to the step 903 of FIG. 9, a detailed description thereof will be omitted.

In step 1905, the processor 120 of the electronic device 101 may receive the handwriting input. The handwriting input may not be a character input through the keypad (or keyboard) but a character, number, symbol, etc., which is desired and directly input by the user. The processor 120 may activate the first layer that receives the handwriting input and recognize the handwriting style input from the first layer. Since step 1905 is similar to the step 905 of FIG. 9, a detailed description thereof will be omitted.

In step 1907, the processor 120 of the electronic device 101 may merge the handwriting input with the object. For example, when the object is an image, the processor 120 may determine a data type as images. The processor 120 may merge the handwriting input with the object and convert the same to bitmap data.

In step 1909, the processor 120 of the electronic device 101 may store the merged object. For example, the user may input the handwriting in the pressure mode while viewing an image or a picture. In this case, the processor 120 may store, in the memory 130, the handwriting input along with the image or picture.

The user may input the handwriting input desired by the user on the picture without the inconvenience of inputting a memo by executing a memo application while displaying the picture in a gallery application, so that the handwriting input can be stored with the picture.

FIGS. 20, 21, 22A and 22B illustrate user interfaces for processing a handwriting input in an electronic device, according to various embodiments of the present disclosure.

Figure 20:
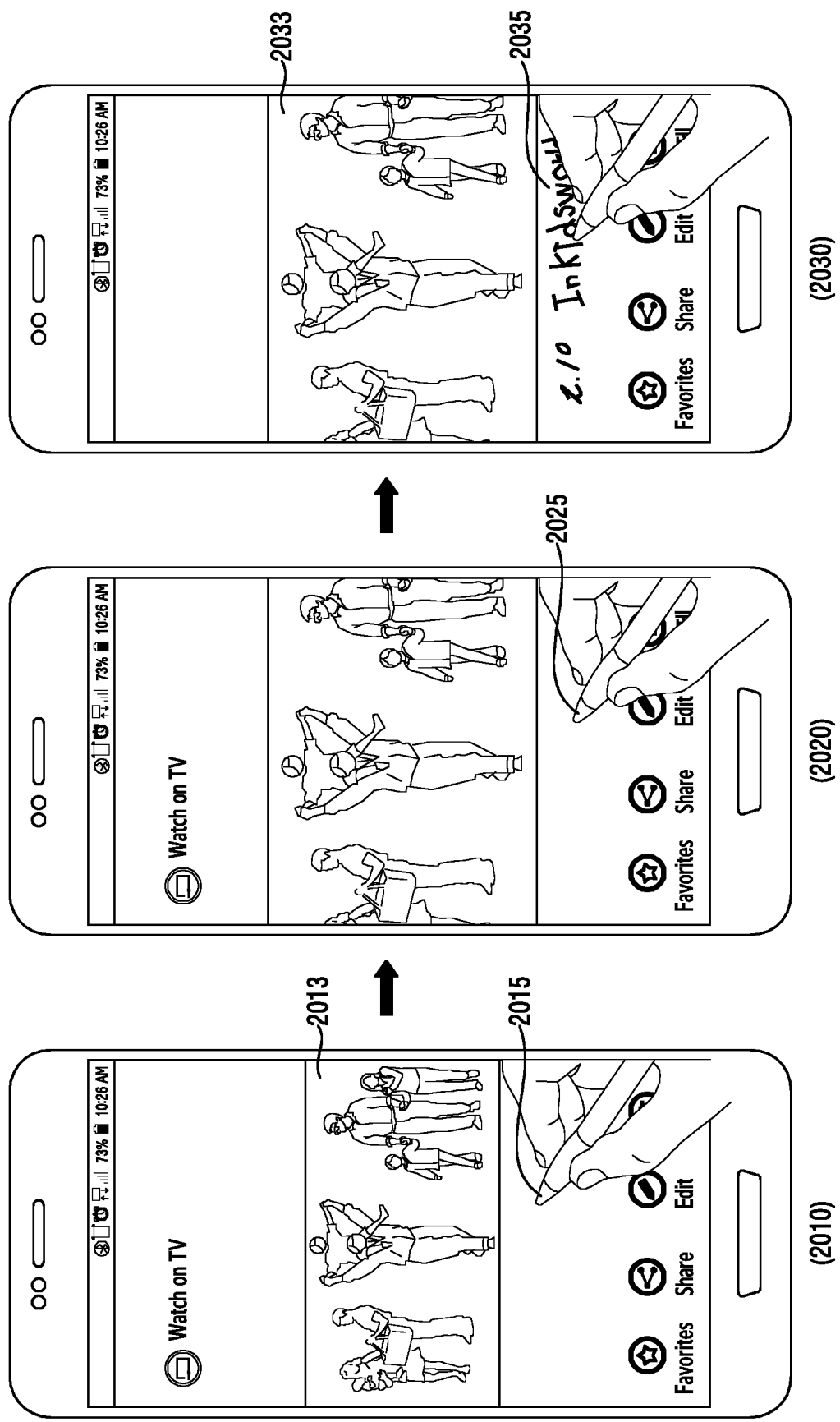
FIGS. 20, 21, 22A and 22B illustrate user interfaces for processing a handwriting input in an electronic device, according to various embodiments of the present disclosure.

Referring to FIG. 20, a user interface for processing a handwriting input in a gallery application of the electronic device 101 is provided. The processor 120 of the electronic device 101 may display a first user interface 2010 for the gallery application. The first user interface 2010 may include an image or video 2013. The processor 120 may detect a pressure input 2015 in the first user interface 2010. The processor 120 may display a second user interface 2020 based on the pressure input 2015. The second user interface 2020 may include an enlarged image or video. The second user interface 2020 is separated into the first layer for receiving the handwriting input and the second layer for displaying the handwriting input, and the first layer may be activated by the processor 120. The processor 120 may display a third user interface 2030 based on a handwriting input 2035. The third user interface 2030 may display an enlarged image or video 2033, and text corresponding to the handwriting input 2035. When the handwriting input is completed, the processor 120 may store, in the memory 130, the handwriting input 2035 along with the enlarged image or video 2033.

Figure 21:
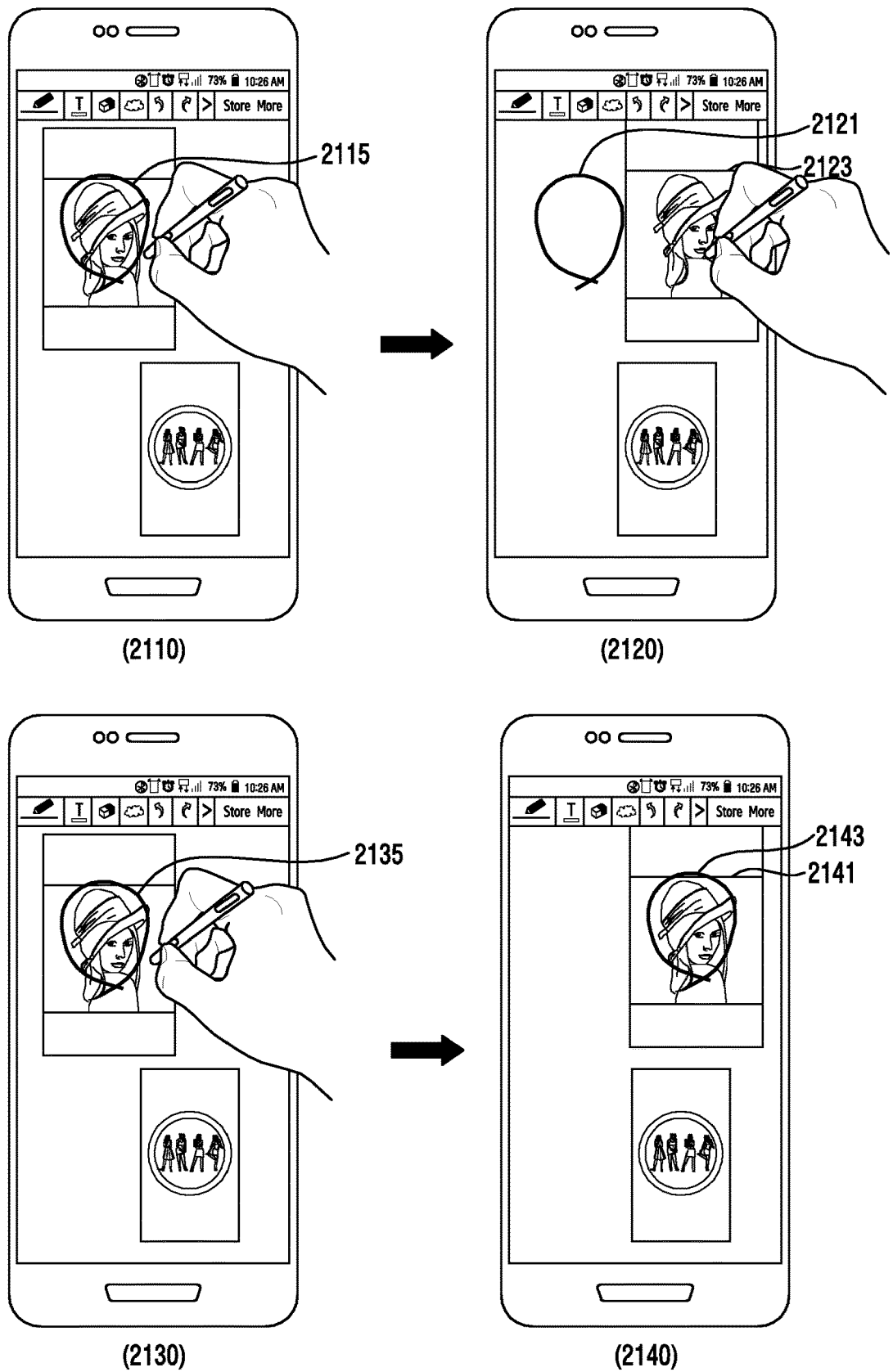

Referring to FIG. 21, a user interface for processing a handwriting input in an image editing application of the electronic device 101 is provided. The processor 120 of the electronic device 101 may display a first user interface 2110 for the image editing application. The processor 120 may receive the handwriting input 2115 over the image in the first user interface 2110. In this case, the handwriting input 2115 may not be the pressure input. In this case, when the handwriting input 2115 moves the position of the displayed image, the position of the handwriting input 2115 is not moved. When the position of the image is moved, the processor 120 may display a second user interface 2120. In the second user interface 2120, the display position of the image 2123 has been moved but the display position of the handwriting input 2121 is not moved.

The processor 120 of the electronic device 101 may display a third user interface 2130 for the image editing application. The processor 120 may receive the pressure input 2135 over the image in the third user interface 2130. In this case, when the pressure input 2135 moves the position of the displayed image, the position of the pressure input 2135 is also moved. When the position of the image is moved, the processor 120 may display a fourth user interface 2140. In the fourth user interface 2140 the display position of the image 2141 and the display position of the pressure input 2143 are both moved.

Figure 22A:
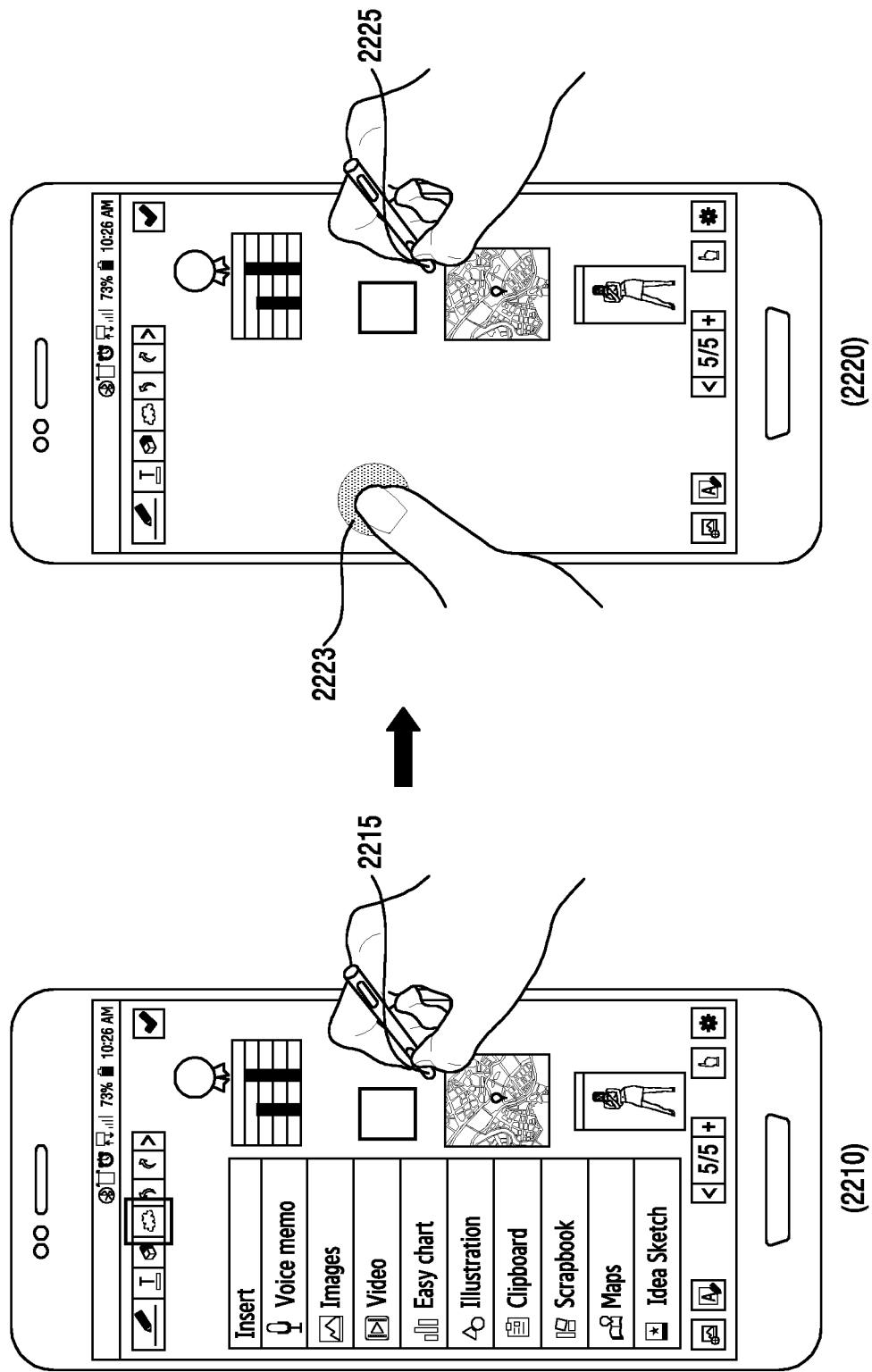
Figure 22B:
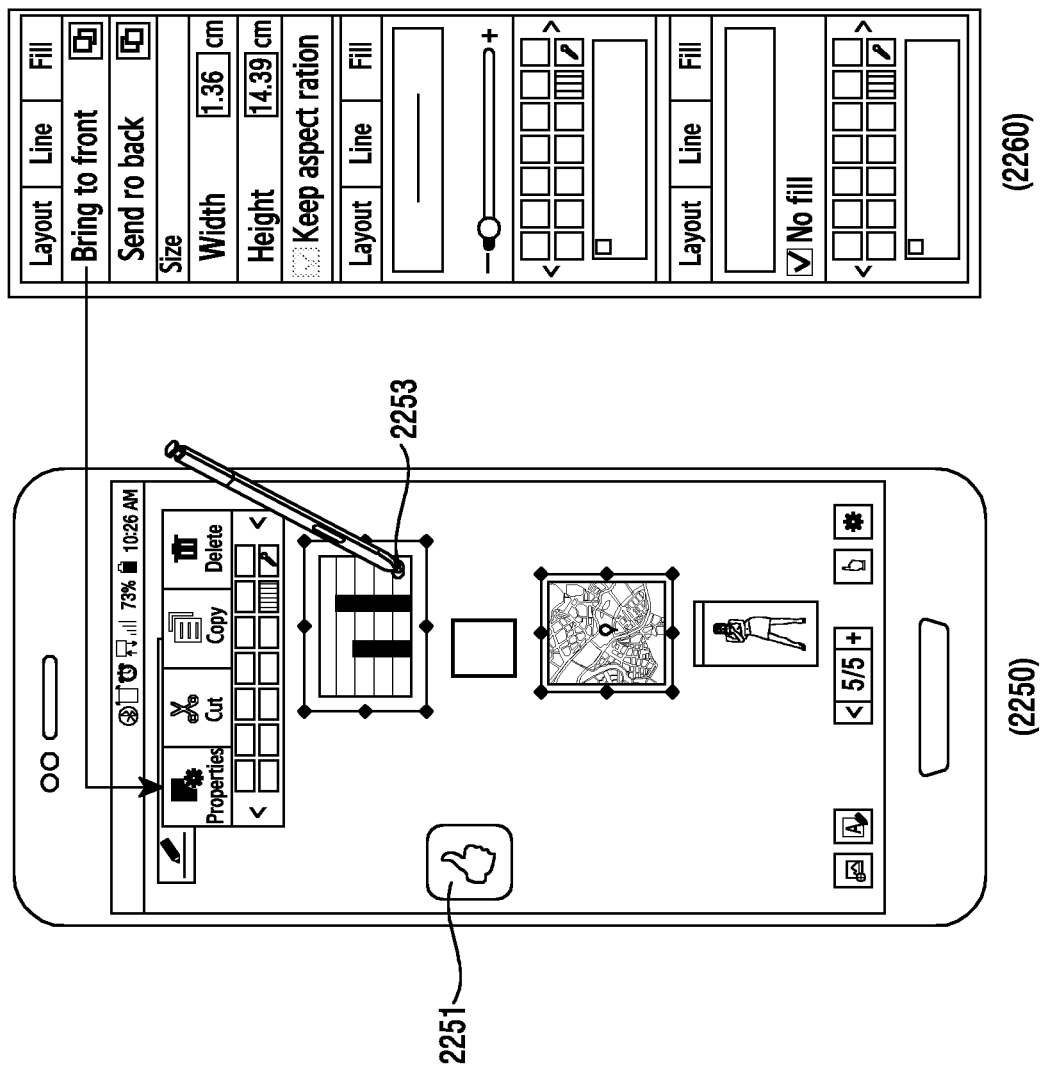

Referring to FIGS. 22A and 22B, a user interface for processing a handwriting input in an image editing application of the electronic device 101 is provided. The processor 120 of the electronic device 101 may display a first user interface 2210 for the image editing application. The processor 120 may detect a touch input 2215 in the first user interface 2210. The touch input 2215 is a pen-touch input and may not be the pressure input. When a touch input different from the touch input 2215 is detected, the processor 120 may operate in a pressure mode. For example, when a touch input 2223 different from a touch input 2225 is detected, the processor 120 may display a second user interface 2220. The second user interface 2220 is separated into a first layer for receiving the handwriting input and a second layer for displaying the handwriting input, and may activate the first layer. In the second user interface 2220, the touch input 2225 is a touch by a pen, and the other touch input 2223 may be a touch by a finger. That is, the processor 120 may control the second user interface 2220 based on the touch input 2225.

For example, the processor 120 may provide a third user interface 2250 based on the touch input 2253 while the other touch input 2251 is detected. The processor 120 may display an icon at a position corresponding to the other touch input 2251, and may identify an object at a position where the touch input 2253 is detected. The processor 120 may convert data corresponding to the touch input 2253 and process the same on the basis of the object or attribute information of the object. For example, the processor 120 may provide a fourth user interface 2260 that includes setting functions such as size, color, brightness, cut, copy, delete, etc. of the object, based on the attribute information of the object where the touch input 2253 is generated.

Any of the modules or programming modules, according to various embodiments of the present disclosure, may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. The various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure. Accordingly, the scope of the present disclosure is defined, not by the detailed description and embodiments, but by the following claims and their equivalents.

What is claimed is:

1. An electronic device, comprising:
a memory configured to store instructions;
a processor;
a display;
a first sensor, operably coupled with the display, configured to obtain location data of a touch input on the display; and
a second sensor, operably coupled with the display, configured to obtain a depression strength of a touch input on the display,
wherein the processor is configured to execute the instructions to:
display a first user interface including a text input portion;
while displaying the first user interface, receive a touch input on the text input portion;
while a contact of the touch input is maintained on the text input portion, identify whether a depression strength of the touch input is greater than a threshold;
based on identifying that the depression strength of the touch input is greater than the threshold, identify the touch input as an input for entering a handwriting input mode instead of an input for calling a virtual keyboard,
in response to entering the handwriting input mode, provide a second user interface through which a handwriting input is received over the first user interface;
receive a handwriting input through the second user interface; and
after receiving the handwriting input through the second user interface, display a character corresponding to a path of the handwriting input.

2. The electronic device of claim 1, wherein the second user interface is superimposed on the text input portion in the first user interface.

3. The electronic device of claim 2, wherein the second user interface is larger than the text input portion in the first user interface.

4. The electronic device of claim 1, wherein the second user interface is displayed concurrently with an executable object for ceasing to receive a handwriting input.

5. The electronic device of claim 1, wherein the second user interface is displayed concurrently with an executable object for providing a web search.

6. The electronic device of claim 1, wherein the processor is further configured to execute the instructions to:
while the virtual keyboard is displayed with the first user interface, receive another touch input on the text input portion;
while a contact of the other touch input is maintained on the text input portion, identify whether a depression strength of the other touch input is greater than the threshold;
based on identifying that the depression strength of the other touch input is greater than the threshold, identify the other touch input as an input for entering the handwriting input mode for another handwriting input; and
cause the virtual keyboard being displayed with the first user interface to disappear.

7. The electronic device of claim 1, wherein the processor is further configured to execute the instructions to:
based on identifying the touch input as an input for entering a handwriting input mode, enable a recognition engine.

8. A method executed in an electronic device, the method comprising:
displaying a first user interface including a text input portion;
while displaying the first user interface, receiving a touch input on the text input portion;
while a contact of the touch input is maintained on the text input portion, identifying whether a depression strength of the touch input is greater than a threshold;
based on identifying that the depression strength of the touch input is greater than the threshold, identifying the touch input as an input for entering a handwriting input mode for a handwriting input instead of an input for calling a virtual keyboard, a second user interface through which a handwriting input is received is provided over the first user interface in the handwriting input mode;
based on identifying the touch input as an input for entering a handwriting input mode, receiving a handwriting input through the second user interface; and
after receiving the handwriting input through the second user interface, displaying a character corresponding to a path of the handwriting input.

9. The method of claim 8, wherein the second user interface is superimposed on the text input portion, and wherein the second user interface is larger than the text input portion.

10. The method of claim 8, wherein the second user interface is displayed concurrently with an executable object for ceasing to receive the handwriting input.

11. The method of claim 8, wherein the second user interface is displayed concurrently with an executable object for providing a web search.

12. The method of claim 8, further comprising:
while the virtual keyboard is displayed with the first user interface, receiving another touch input on the text input portion;
while a contact of the other touch input is maintained on the text input portion, identifying whether a depression strength of the other touch input is greater than the threshold;
based on identifying that the depression strength of the other touch input is greater than the threshold, identifying the other touch input as an input for entering the handwriting input mode for another handwriting input; and
causing the virtual keyboard being displayed with the first user interface to disappear.

13. The method of claim 8, wherein receiving the handwriting input through the handwriting input portion comprises:
based on identifying the touch input as an input for entering a handwriting input mode, enabling a recognition engine.

* * * * *